US012792205B2

(12) United States Patent
Kitazawa

(10) Patent No.: US 12,792,205 B2
(45) Date of Patent: Nov. 10, 2026

(54) NON-TRANSITORY COMPUTER READABLE MEDIUM STORING INFORMATION PROCESSING PROGRAM FOR AUTOMATICALLY HIDING AND RESTORING AN IMAGE IN RESPONSE TO A USER OPERATION

(71) Applicant: FUJIFILM Business Innovation Corp., Tokyo (JP)

(72) Inventor: Yuka Kitazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/401,340

(22) Filed: Aug. 13, 2021

(65) Prior Publication Data

US 2022/0300146 A1 Sep. 22, 2022

(30) Foreign Application Priority Data

Mar. 19, 2021 (JP) ................................ 2021-046365

(51) Int. Cl.

| | |
|---|---|
| ***G06F 3/04842*** | (2022.01) |
| ***G06F 3/04817*** | (2022.01) |
| ***G06F 3/0482*** | (2013.01) |
| ***G06F 3/0483*** | (2013.01) |
| ***G06F 3/0484*** | (2022.01) |
| ***G06F 3/0486*** | (2013.01) |

(52) U.S. Cl.

CPC ...... *G06F 3/04842* (2013.01); *G06F 3/04817* (2013.01); *G06F 3/0482* (2013.01); *G06F 3/0483* (2013.01); *G06F 3/0484* (2013.01); *G06F 3/0486* (2013.01)

(58) Field of Classification Search

None

See application file for complete search history.

(56) References Cited

U.S. PATENT DOCUMENTS 5,422,993 A * 6/1995 Fleming .............. G06F 3/04817 715/835
5,651,107 A 7/1997 Frank et al.
(Continued)

FOREIGN PATENT DOCUMENTS

| | | |
|---|---|---|
| JP | H10293673 | 11/1998 |
| JP | 3014286 | 2/2000 |
| JP | 3598303 | 12/2004 |

OTHER PUBLICATIONS

"Notice of Reasons for Refusal of Japan Counterpart Application", issued on Oct. 1, 2024, with English translation thereof, p. 1-p. 15.

*Primary Examiner* — Irete F Ehichioya
*Assistant Examiner* — Phoebe X Pan
(74) *Attorney, Agent, or Firm* — JCIPRNET

(57) ABSTRACT

A non-transitory computer readable medium storing an information processing program causes a computer to execute a function of, in a case where a user selects an image displayed on a display unit, displaying an image larger than the selected image, which is the image selected by the user, on the display unit, and a function of, in a state where the user selects another image displayed on the display unit and different from the selected image, in a case where the user performs a predetermined operation, changing display of the larger image displayed on the display unit.

9 Claims, 24 Drawing Sheets

(56) References Cited

U.S. PATENT DOCUMENTS

| | | | | | |
|---|---|---|---|---|---|
| 5,689,666 | A * | 11/1997 | Berquist | G09G 5/14 | 715/797 |
| 5,745,112 | A | 4/1998 | Hirose | | |
| 5,999,191 | A | 12/1999 | Frank et al. | | |
| 6,025,841 | A * | 2/2000 | Finkelstein | G09G 5/14 | 715/803 |
| 6,229,542 | B1 * | 5/2001 | Miller | G06F 3/04815 | 715/788 |
| 6,384,840 | B1 | 5/2002 | Frank et al. | | |
| 6,628,309 | B1 * | 9/2003 | Dodson | G06F 3/0486 | 715/781 |
| 6,642,944 | B2 * | 11/2003 | Conrad | G06F 3/0483 | 715/764 |
| 6,694,486 | B2 | 2/2004 | Frank et al. | | |
| 8,959,446 | B2 * | 2/2015 | Igeta | G06F 3/0481 | 715/822 |
| 8,982,395 | B2 * | 3/2015 | Yamazaki | G06F 3/0482 | 358/1.9 |
| 11,169,685 | B2 * | 11/2021 | Louch | G06F 3/0486 | |
| 2003/0076362 | A1 * | 4/2003 | Terada | G06F 3/0486 | 715/781 |
| 2003/0179234 | A1 * | 9/2003 | Nelson | G06F 3/04845 | 715/764 |
| 2007/0022389 | A1 * | 1/2007 | Ording | G06F 3/04847 | 715/790 |
| 2007/0226642 | A1 | 9/2007 | Soulier | | |
| 2010/0257482 | A1 * | 10/2010 | Lyons | G06F 3/0486 | 715/835 |
| 2013/0198692 | A1 * | 8/2013 | Lin | G06F 3/0481 | 715/835 |
| 2014/0063541 | A1 * | 3/2014 | Yamazaki | G06F 3/1285 | 358/1.15 |
| 2016/0239189 | A1 * | 8/2016 | Weber | G06F 16/9577 | |
| 2018/0225019 | A1 * | 8/2018 | Xie | G06F 3/04886 | |

* cited by examiner

NON-TRANSITORY COMPUTER READABLE MEDIUM STORING INFORMATION PROCESSING PROGRAM FOR AUTOMATICALLY HIDING AND RESTORING AN IMAGE IN RESPONSE TO A USER OPERATION

CROSS-REFERENCE TO RELATED APPLICATIONS

This application is based on and claims priority under 35 USC 119 from Japanese Patent Application No. 2021-046365 filed Mar. 19, 2021.

BACKGROUND

(i) Technical Field

The present invention relates to a non-transitory computer readable medium storing an information processing program.

(ii) Related Art

JP3014286B discloses a process of hiding a window in which a dragged icon cannot be processed, in response to a user initiating dragging of one or more of the displayed icons.

JP1998-293673A discloses a means for inspecting the overlap of windows and a means for generating a balloon, an icon, or the like corresponding to a hidden window.

JP3598303B discloses a method of selectively displaying and activating a plurality of overlapping display objects on a display in a computer system.

SUMMARY

In an apparatus provided with a display unit, in a case where a display image, which is an image displayed on the display unit, is selected, an image larger than the display image, such as an enlarged image of the display image, may be displayed.

In a case where a large image is displayed as a result of selecting a display image, the display behind the large image becomes invisible, which may reduce the operability of the user who wants to perform further operations.

Aspects of non-limiting embodiments of the present disclosure relate to a non-transitory computer readable medium storing an information processing program that prevents the operability on another image from being lowered, due to a large image displayed by the selection of an image, as compared to a case where the display of the larger image displayed by the selection of the image is not changed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing an information processing program causing a computer to execute a function of, in a case where a user selects an image displayed on a display unit, displaying an image larger than the selected image, which is the image selected by the user, on the display unit, and a function of, in a state where the user selects another image displayed on the display unit and different from the selected image, in a case where the user performs a predetermined operation, changing display of the larger image displayed on the display unit.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described in detail with reference to the accompanying drawings.

Figure 1:
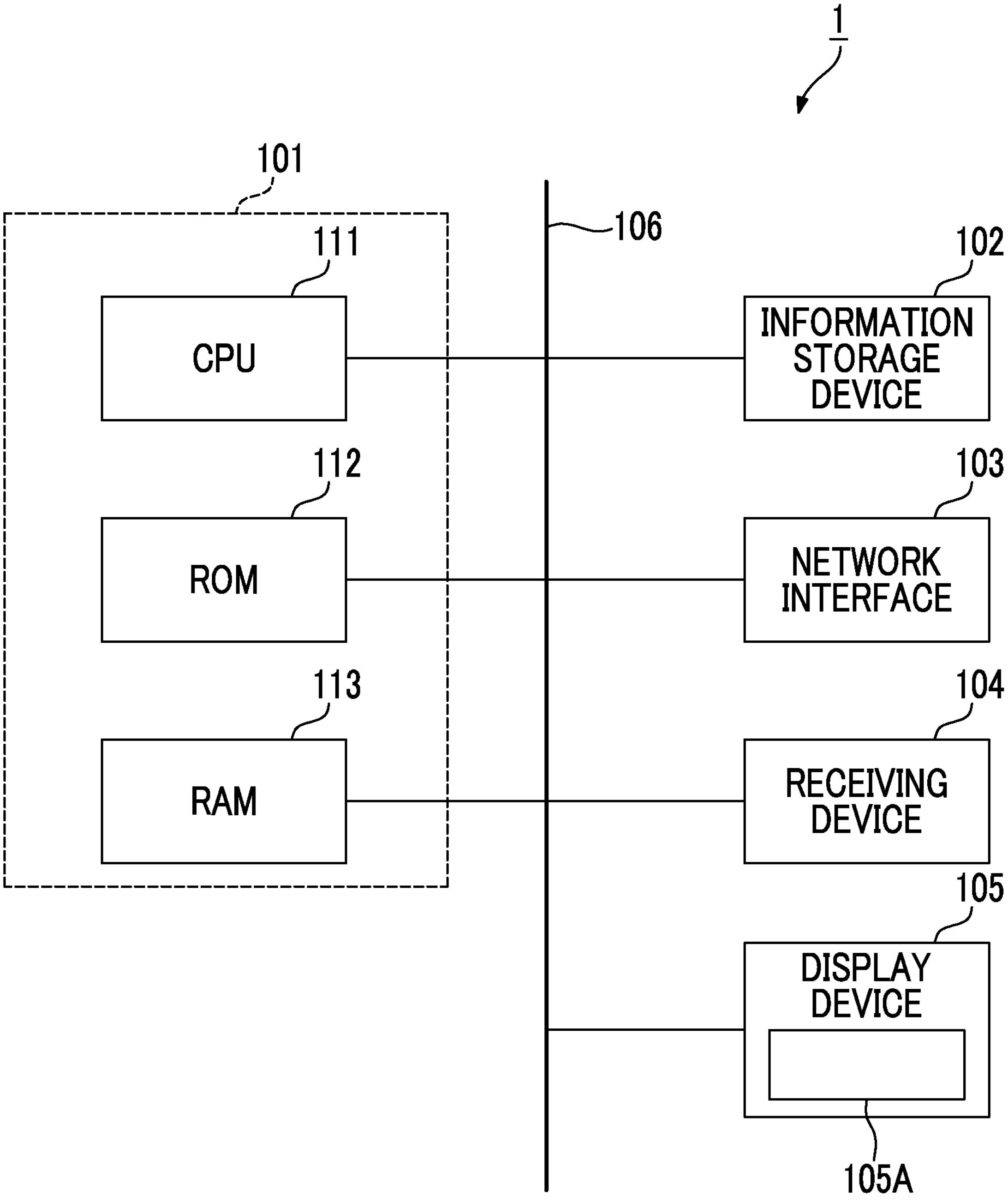
FIG. 1 is a diagram illustrating an example of a hardware configuration of an information processing system.

FIG. 1 is a diagram illustrating an example of the hardware configuration of an information processing system 1 of the present exemplary embodiment.

The information processing system 1 of the present exemplary embodiment includes an information processing unit 101, an information storage device 102 that stores information, and a network interface 103 that achieves communication via a local area network (LAN) cable or the like.

Further, the information processing system 1 is provided with a receiving device 104 for receiving an operation of an operator and a display device 105 for displaying information.

The receiving device 104 is configured by devices such as a keyboard and a mouse, and in the present exemplary embodiment, the information input to the information processing system 1 by the operator is received by the receiving device 104.

The display device 105 is a liquid crystal display, an organic EL display, or the like. The display device 105 includes a display unit 105A for displaying an image. Various screens described later are displayed on the display unit 105A.

The information storage device 102 is achieved by existing information storage devices such as a hard disk drive, a semiconductor memory, and a magnetic tape.

The information processing unit 101 includes a central processing unit (CPU) 111 as an example of a processor, a read only memory (ROM) 112 in which basic software, a basic input output system (BIOS), and the like are stored, and a random access memory (RAM) 113 to be used as a work area.

The CPU 111 may be multi-core. Further, the ROM 112 may be a rewritable non-volatile semiconductor memory. The information processing unit 101 is a so-called computer.

The information processing unit 101, the information storage device 102, the network interface 103, the receiving device 104, and the display device 105 are connected via a bus 106 or a signal line (not illustrated).

Here, the program to be executed by the CPU 111 can be provided to the information processing system 1 by being stored in a computer readable recording medium such as a magnetic recording medium (a magnetic tape, a magnetic disk, etc.), an optical recording medium (optical disk, etc.), an optical magnetic recording medium, or a semiconductor memory. Further, the program to be executed by the CPU 111 may be provided to the information processing system 1 by using a communication means such as the Internet.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The display process executed by the CPU 111 will be described. FIGS. 2A to 24 are diagrams illustrating display examples in the display unit 105A of the display device 105.

In the present exemplary embodiment, the CPU 111 as an example of the processor executes the program stored in the ROM 112 or the information storage device 102 to execute the display process described below.

In the present exemplary embodiment, in a case where the user selects an image displayed on the display unit 105A, the CPU 111 displays an image larger than the selected image, which is the image selected by the user, on the display unit 105A. Thus, the user easily sees the image selected by the user.

First Display Example

Figure 2A:
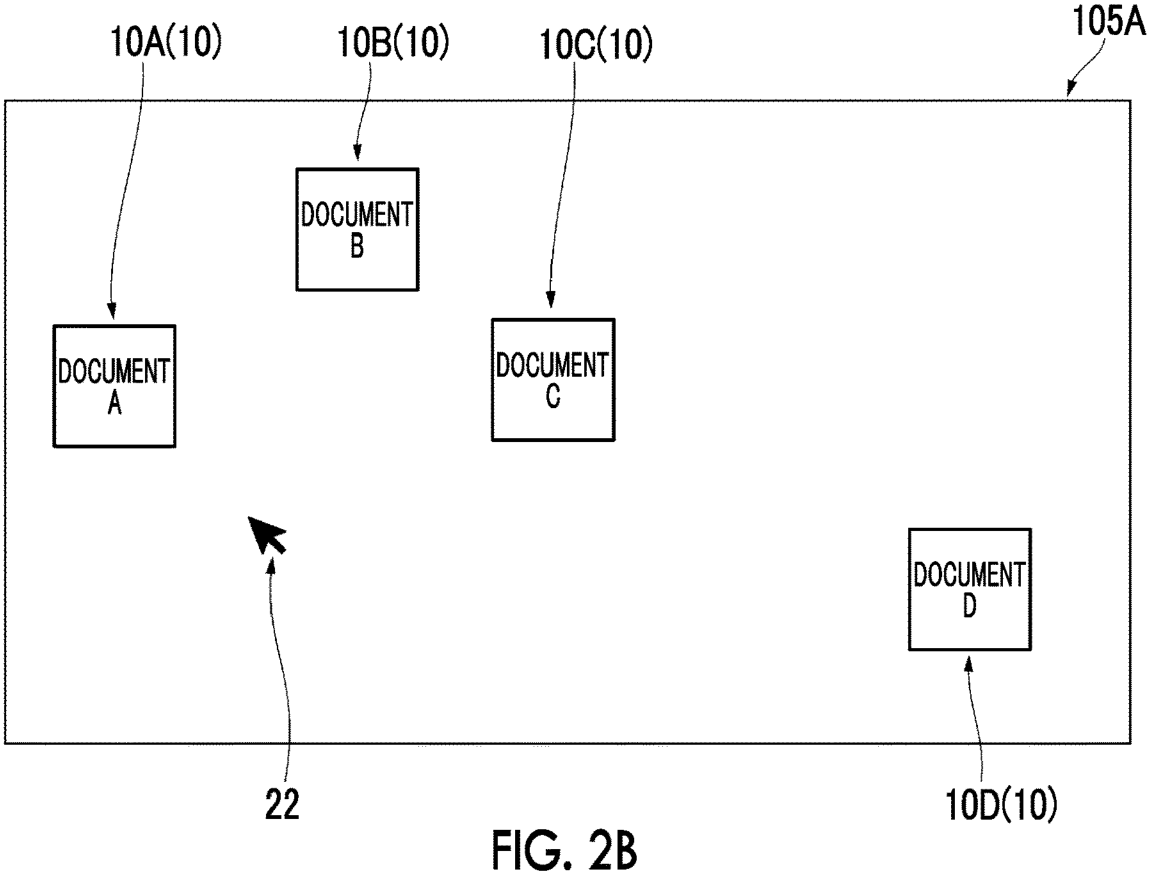
FIGS. 2A and 2B are diagrams illustrating display examples in a display unit of a display device.

In the display example illustrated in FIG. 2A, the document images 10 that are images respectively representing documents A to D are displayed on the display unit 105A.

In the present exemplary embodiment, as the document images 10, a document image 10A representing a document A, a document image 10B representing a document B, a document image 10C representing a document C, and a document image 10D representing the document D are displayed.

Further, a pointer 22 that moves according to the operation of the mouse by the user is displayed on the display unit 105A. The pointer 22 indicates a location where the user performs an operation.

Figure 2B:
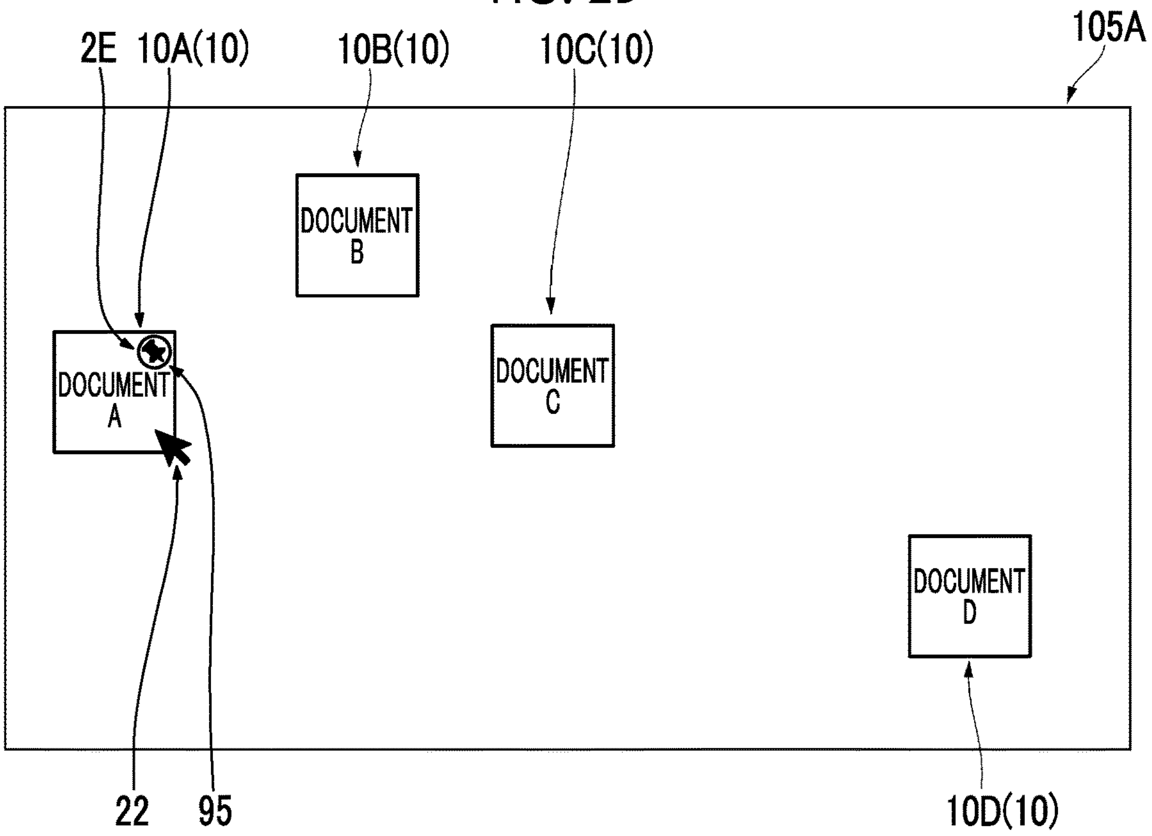

FIG. 2B illustrates a state after the user moves the pointer 22 to the document image 10A corresponding to the document A.

In the present exemplary embodiment, in a case where the pointer 22 is moved to the document image 10A, a selection portion 95, that the user selects in a case where the user wants to enlarge and display the document image 10A, is displayed on the document image 10A, as indicated by reference numeral 2E.

Figure 3A:
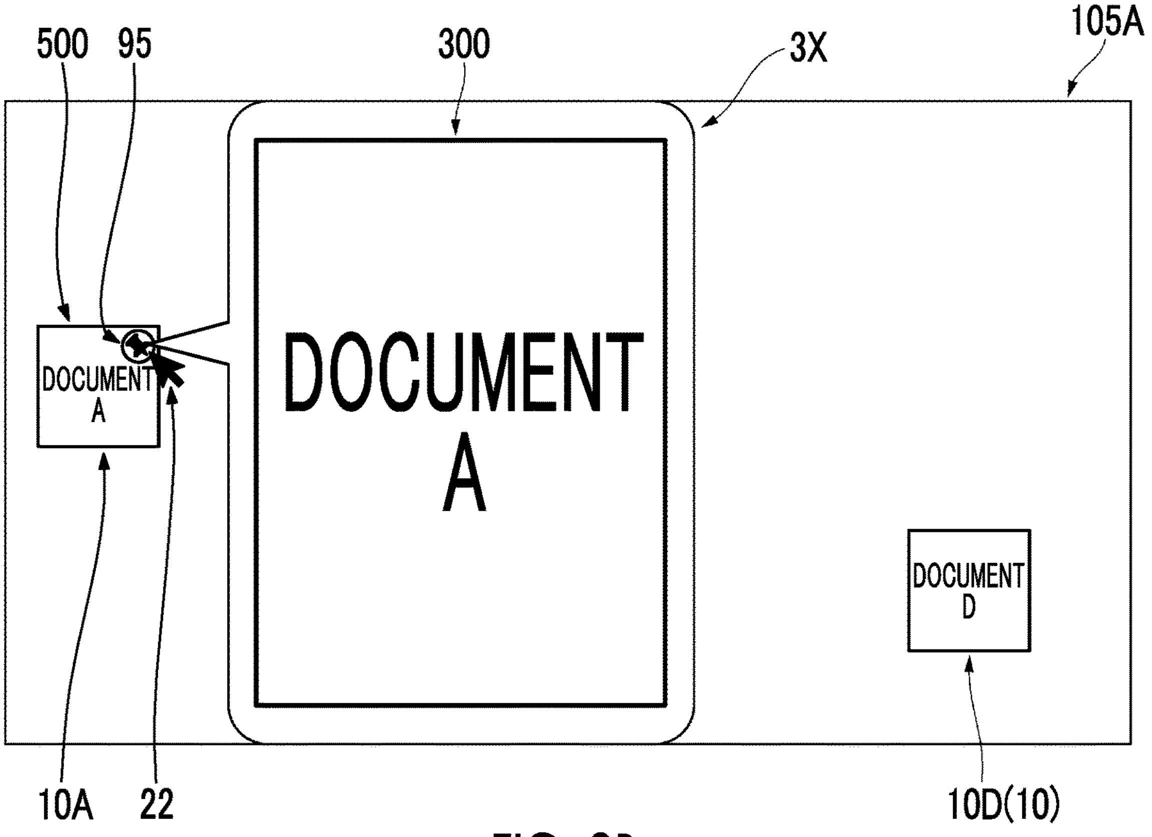
FIGS. 3A and 3B are diagrams illustrating display examples in the display unit of the display device.

Then, in the present exemplary embodiment, as illustrated in FIG. 3A, in a case where the user moves the pointer 22 to the selection portion 95, as illustrated by reference numeral 3X, an image 300 that is larger than the document image 10A, on which the selection part 95 is displayed, is displayed on the display unit 105A.

Figure 3B:
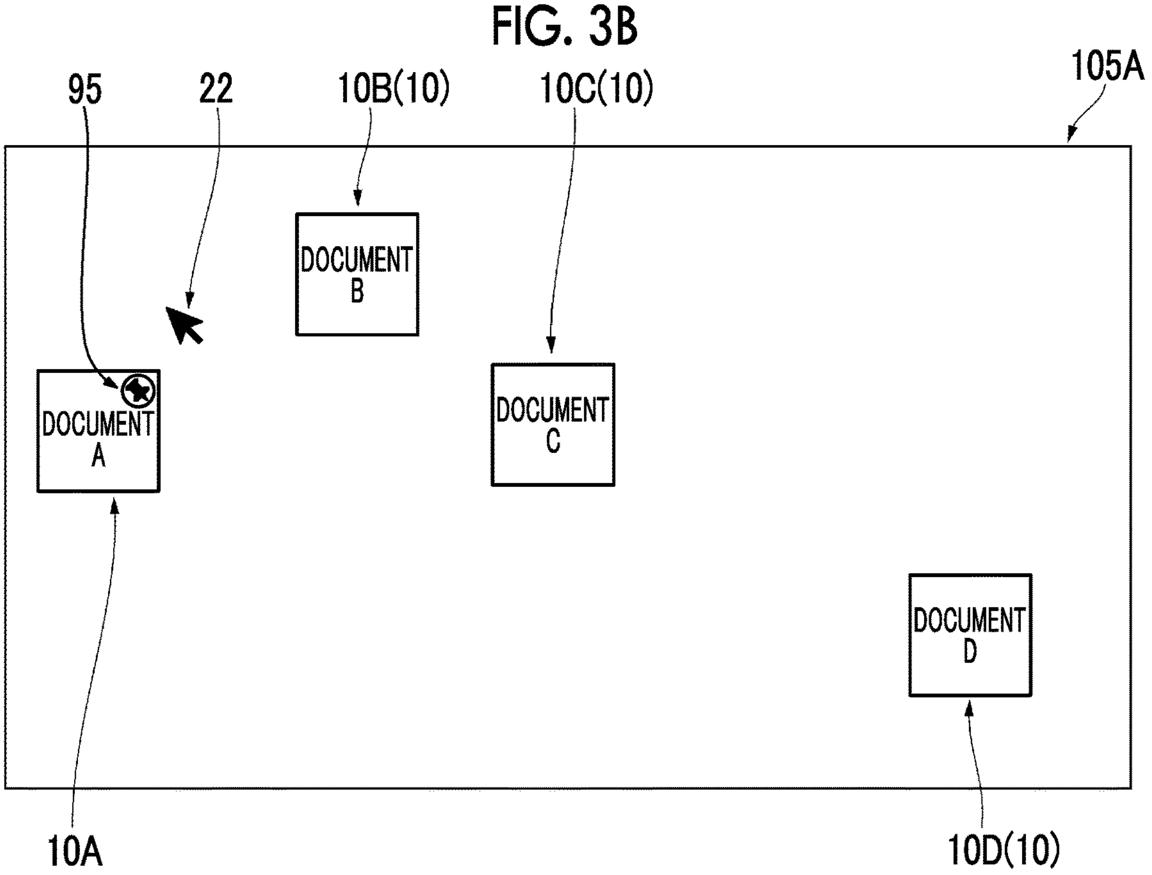

Further, in the present exemplary embodiment, as illustrated in FIG. 3B, in a case where the user moves the pointer 22 to a position other than the selection portion 95, the large image 300 is hidden.

As described above, in the present exemplary embodiment, in a case where the user selects the document image 10A displayed on the display unit 105A, the image 300 larger than the document image 10A selected by the user is displayed on the display unit 105A.

The document image 10A illustrated in FIG. 3A corresponds to the selected image 500 selected by the user, and in the present exemplary embodiment, the image 300 larger than the selected image 500 is displayed.

Here, examples of the "large image 300" include an enlarged image of the selected image 500. In this case, the content of the image represented by the enlarged image and the content of the image represented by the selected image 500 match each other.

In addition, examples of the "large image 300" include an image displayed by opening the file represented by the selected image 500. In this case, the content of the image represented by the selected image 500 may differ from the content of the image represented by the large image 300.

Further, the "large image 300" refers to an image having an area larger than the area of the selected image 500. The shape of the "large image 300" is not particularly limited, and the shape of the selected image 500 and the shape of the large image 300 may be different from each other.

In the example illustrated in FIG. 3A, the shape of the selected image 500 and the shape of the large image 300 have a similar relationship.

Further, in the example illustrated in FIG. 3A, the large image 300 is displayed at a location different from the display location of the selected image 500. Thus, even in a case where the large image 300 is displayed, the selected image 500 can be visually recognized.

In the present exemplary embodiment, the display location and size of the large image 300 are not fixed, and are automatically set according to the size of the browser and the position of the selected image 500.

Figure 4A:
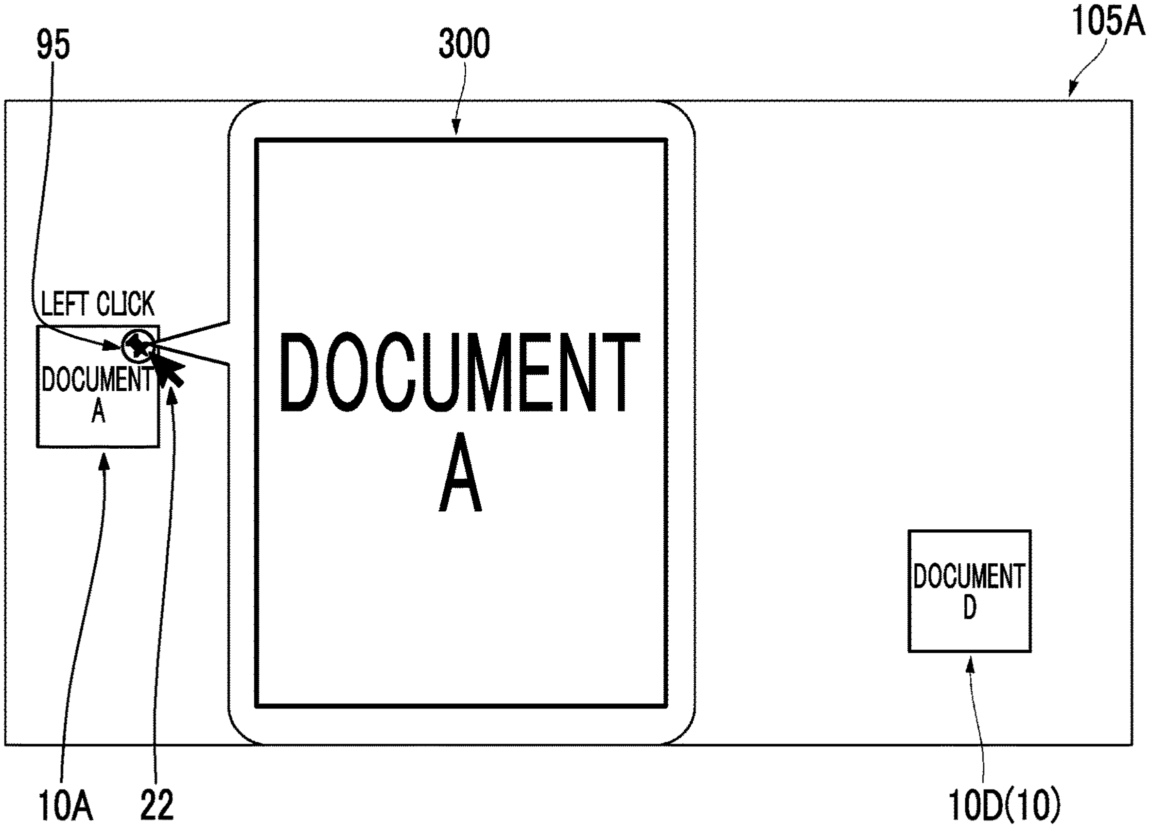
FIGS. 4A and 4B are diagrams illustrating display examples in a display unit of a display device.

Further, in the present exemplary embodiment, as illustrated in FIG. 4A, in a case where the pointer 22 is moved to the selection portion 95, the user left-clicks the mouse and selects the selection portion 95, the state in which the large image 300 is displayed is maintained.

Figure 4B:
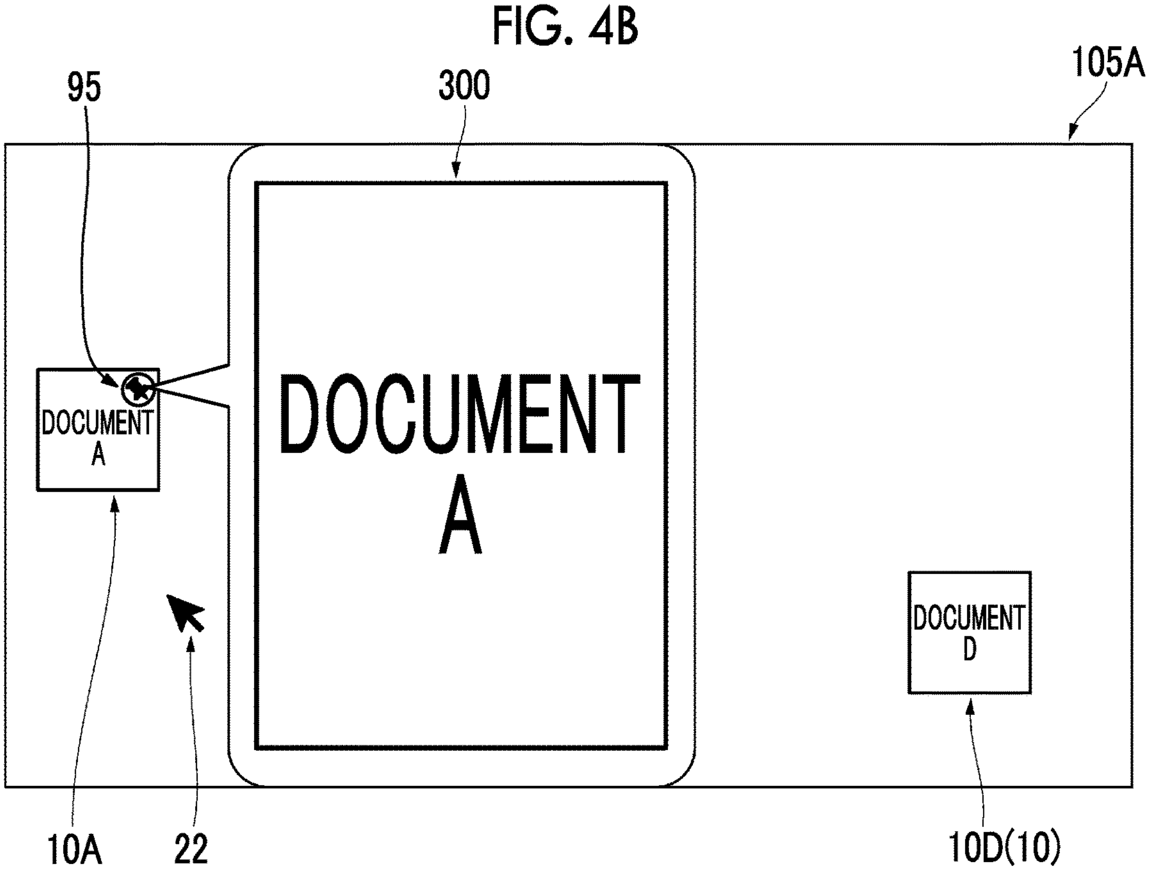

In this case, as illustrated in FIG. 4B, even in a case where the pointer 22 is moved to a position other than the selection portion 95, the large image 300 is not hidden and the large image 300 remains displayed.

In other words, in the present exemplary embodiment, in a case where the user performs an operation of selecting the selection portion 95, the CPU 111 maintains the state in which the large image 300 is displayed even in a case where the pointer 22 is moved to a position other than the selection portion 95. In this case, even in a case where the user moves the pointer 22 to a position other than the selection portion 95, the user can refer to the large image 300.

Figure 5A:
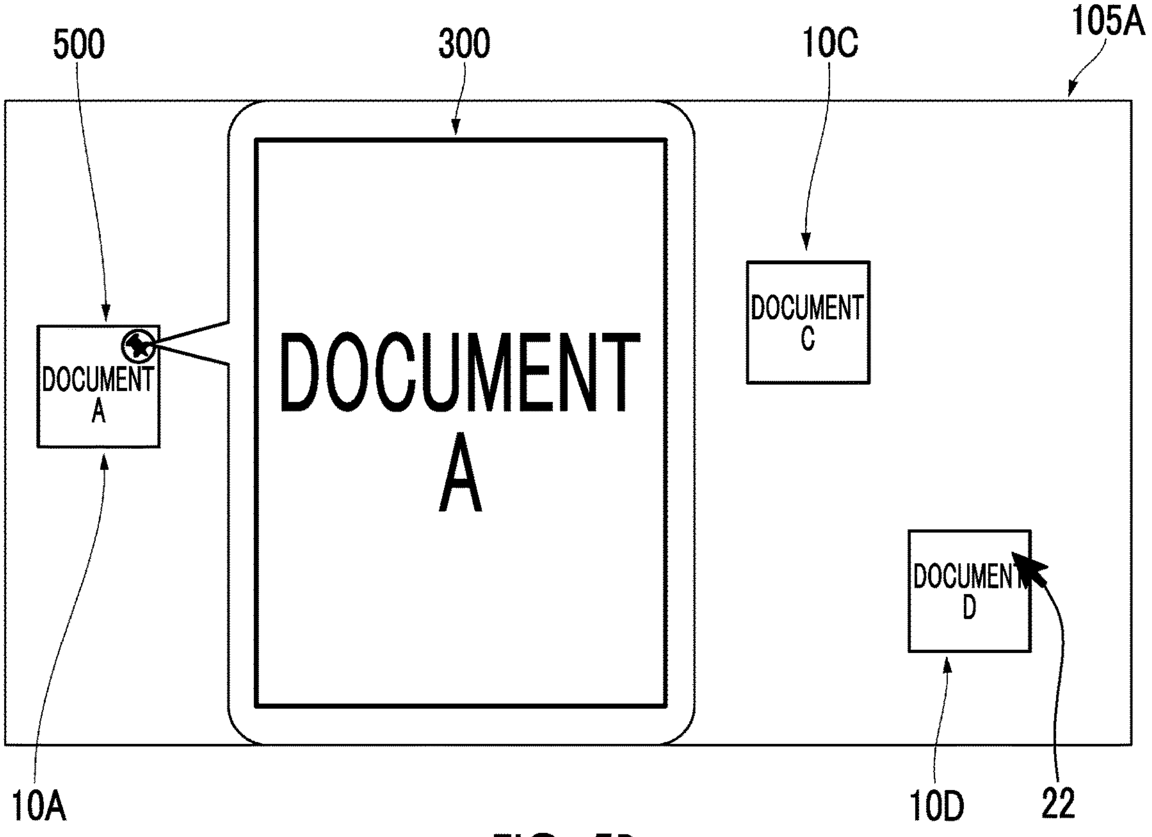
FIGS. 5A and 5B are diagrams illustrating display examples in the display unit of the display device.
Figure 5B:
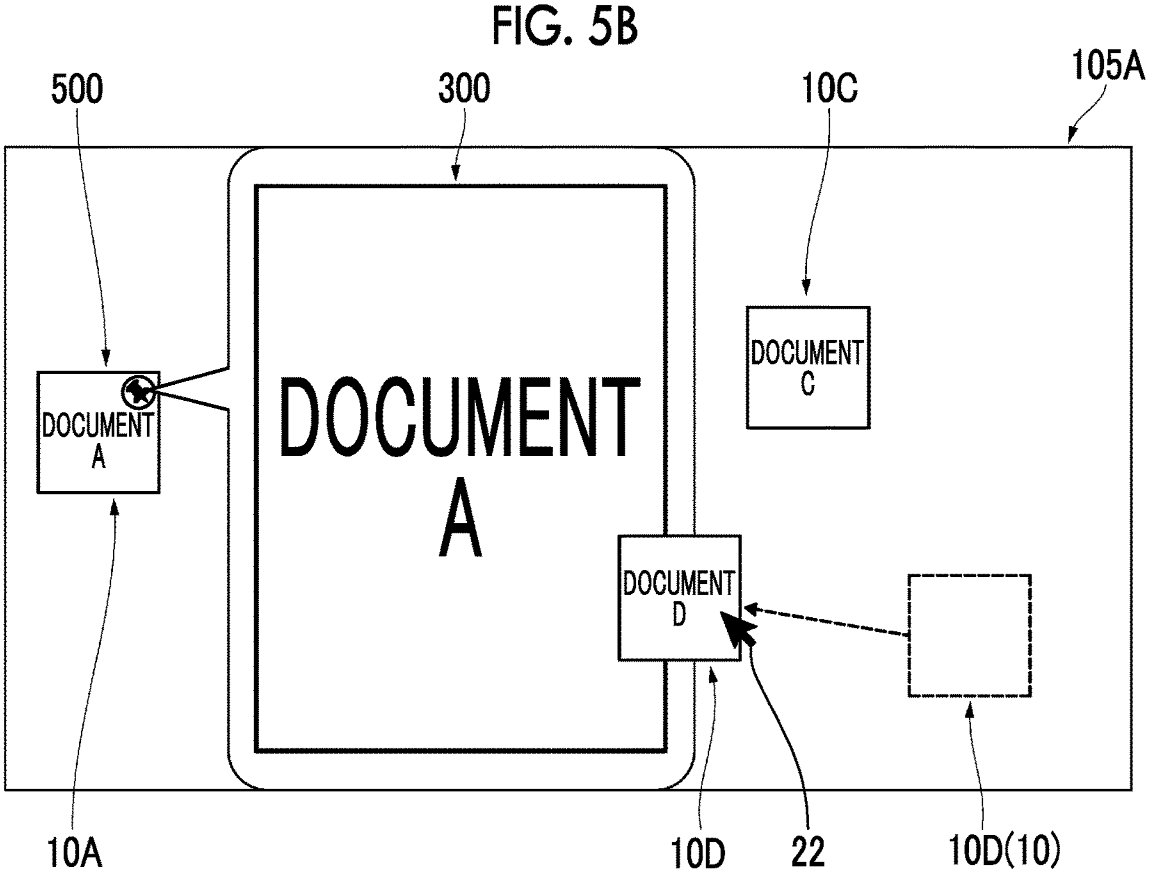

After that, in this processing example, as illustrated in FIGS. 5A and 5B, the user selects the document image 10D and then moves the document image 10D to the display location of the large image 300.

Specifically, in this processing example, a case is illustrated where the user moves the document image 10D, which is another image different from the document image 10A that is the selected image 500, behind the large image 300.

More specifically, this processing example indicates the case where the user determines that the placement location of the document image 10D is behind the large image 300, and the user moves the document image 10D behind the large image 300.

More specifically, the user may determine the placement location of the document for each type and content of the document, and this processing example indicates the case where the user determines that the placement location of the document image 10D is behind the large image 300.

In this case, the user first selects the document image 10D, and then moves the selected document image 10D toward the display location of the large image 300.

In a case of moving the document image 10D, in a state where the user has selected the document image 10D, the user moves the document image 10D toward the display location of the large image 300.

Specifically, the user presses the left button of the mouse, drags the document image 10D, and then moves the mouse to move the document image 10D to the display location of the large image 300.

Then, in the present exemplary embodiment, as illustrated in FIG. 5B, in a case where the large image 300 and the document image 10D overlap, the display of the large image 300 is changed.

Specifically, in the present exemplary embodiment, in a case where the document image 10D located at a location deviated from the display location of the large image 300 is moved toward the display location, and the large image 300 and the document image 10D overlap with each other, the display of the large image 300 is changed.

Figure 6A:
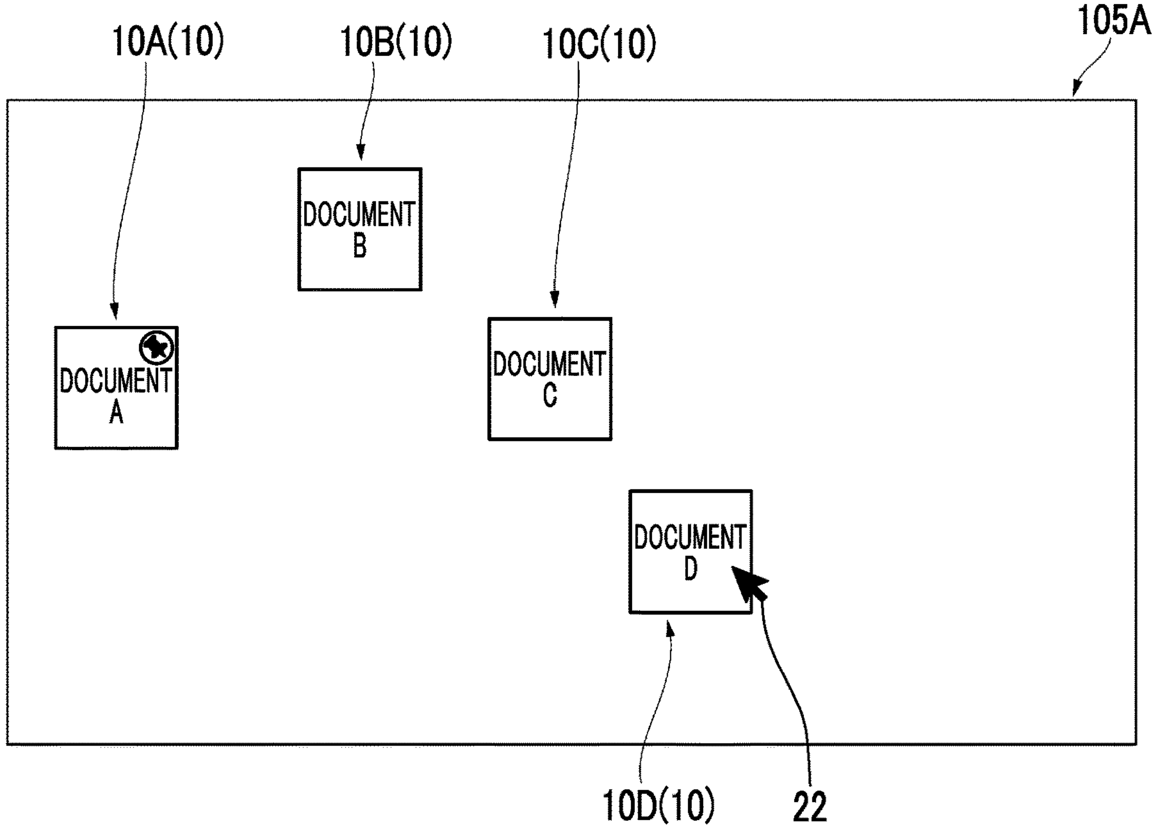
FIGS. 6A and 6B are diagrams illustrating display examples in the display unit of the display device.

Specifically, in a case where the large image 300 and the document image 10D overlap, the CPU 111 hides the large image 300 as a change in the display of the large image 300, as illustrated in FIG. 6A.

In this example, the case is described where the display of the large image 300 is changed in a case where a part of the large image 300 overlaps with a part of the document image 10D, but the display of the large image 300 may be changed in a case where all the parts of the document image 10D and the large image 300 overlap with each other.

In the present exemplary embodiment, in a case where the large image 300 and the document image 10D overlap, the display of the large image 300 is changed such that the user can grasp the display state on the display unit 105A, that is, the display state behind the large image 300.

Specifically, in the present exemplary embodiment, the large image 300 displayed on the display unit 105A is hidden, so that the user can grasp the display state behind the large image 300.

In the present exemplary embodiment, the case where all the parts of the large image 300 are hidden has been described, but a part of the large image 300 may be hidden.

As described above, in the present exemplary embodiment, in a state where the user selects a document image 10D that is another image different from the document image 10A that is the selected image 500 selected by the user, in a case where the user performs a predetermined operation, the display of the large image 300 is changed.

Specifically, in this example, in a state where the user selects the document image 10D, in a case where the user performs an operation of moving the document image 10D to the display location of the large image 300, the display of the large image 300 is changed.

In order to enable the user to grasp the display state behind the large image 300, in addition to hiding the large image 300, for example, the display density of the large image 300 may be reduced to enable the user to grasp the display state behind the large image 300.

Further, for example, the user may be able to grasp the display state behind the large image 300 by making a change to make the large image 300 smaller or changing the display position of the large image 300.

Further, in changing the display of the large image 300, only one process or two or more processes among hiding, changing the density, changing the size, and changing the display position may be performed.

Figure 6B:
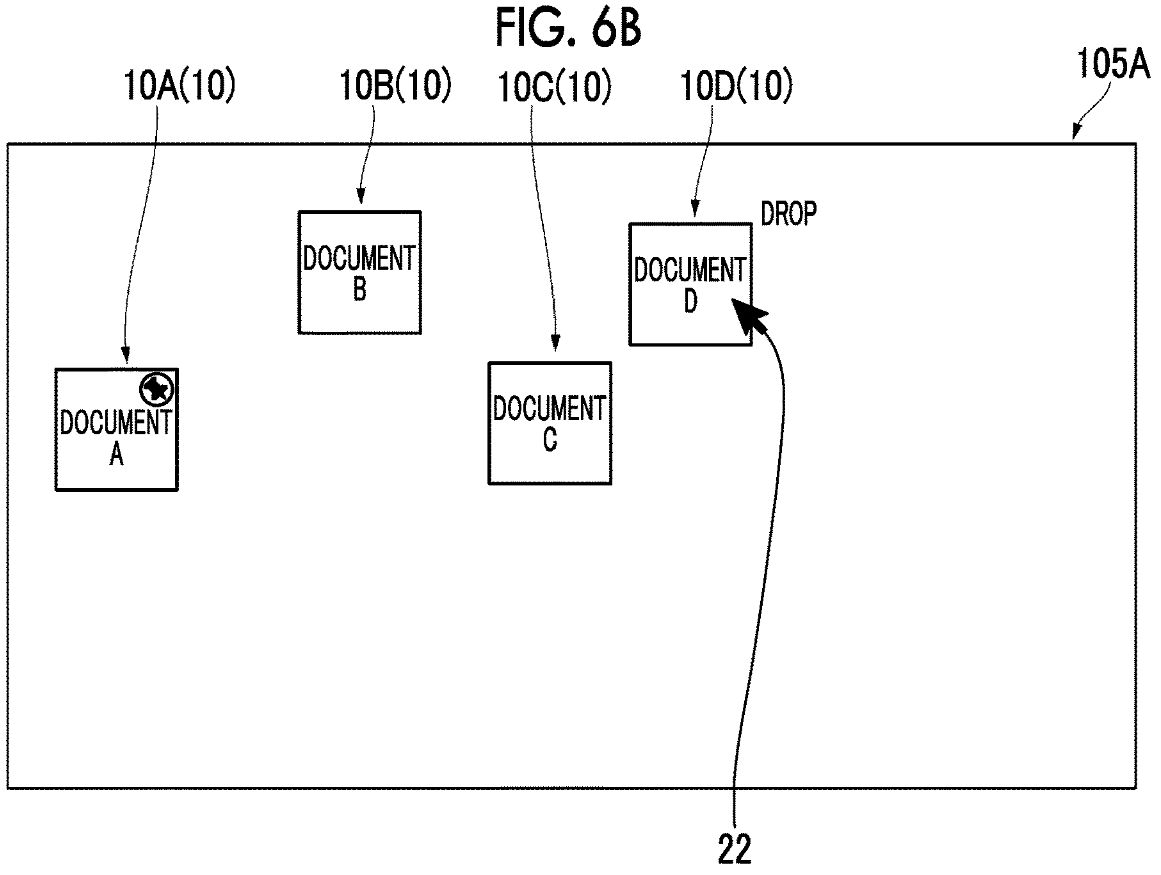

After that, in this processing example, as illustrated in FIG. 6B, the document image 10D is dropped to the place where the large image 300 has been displayed. In other words, in this example, the user stops pressing the left button of the mouse continuously, and the user deselects the document image 10D.

Figure 7:
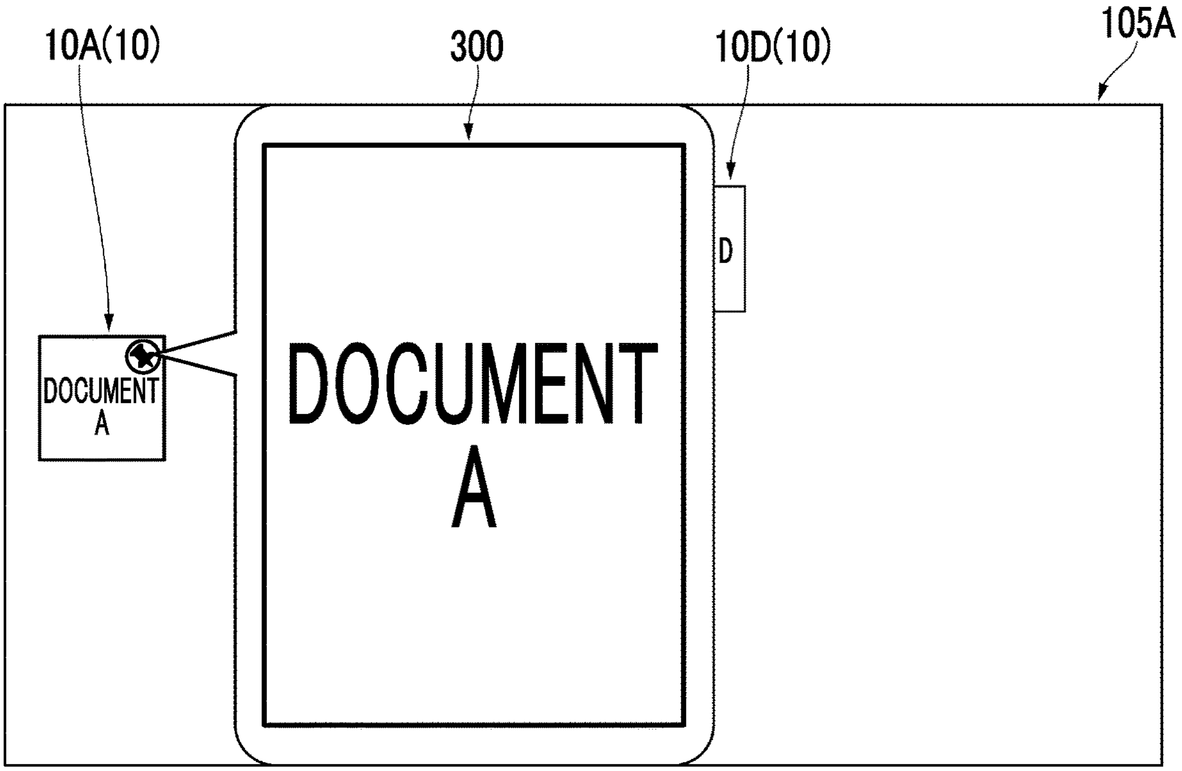
FIG. 7 is a diagram illustrating a display example in the display unit of the display device.

Thereby, in this case, as illustrated in FIG. 7, the large image 300 is redisplayed.

In the present exemplary embodiment, as described above, after the user performs the operation on the document image 10D, the state of the large image 300 that is in the state after the display change is returned to the state before the display is changed. Specifically, in this example, the large image 300 is redisplayed.

In the present exemplary embodiment, the CPU 111 performs a process of hiding at least a part of the large image 300 displayed on the display unit 105A, in a case where the user performs the operation of moving the document image 10D.

Then, after the user performs the operation of moving the document image 10D, the CPU 111 performs a process of displaying the hidden part of the large image 300 of which at least a part has been hidden.

By the above process, in the present exemplary embodiment, the large image 300 is hidden without the user performing a dedicated operation for hiding the large image 300. Thus, the user can more easily perform the operation of moving the document image 10D as compared with the case where the user performs the dedicated operation for hiding the large image 300 by himself or herself.

Further, in the present exemplary embodiment, the large image 300 is redisplayed without the user performing a dedicated operation for redisplaying the large image 300 that has been hidden.

In other words, in the present exemplary embodiment, the hiding of the large image 300 and the redisplay of the large image 300 are automatically performed.

Figure 8A:
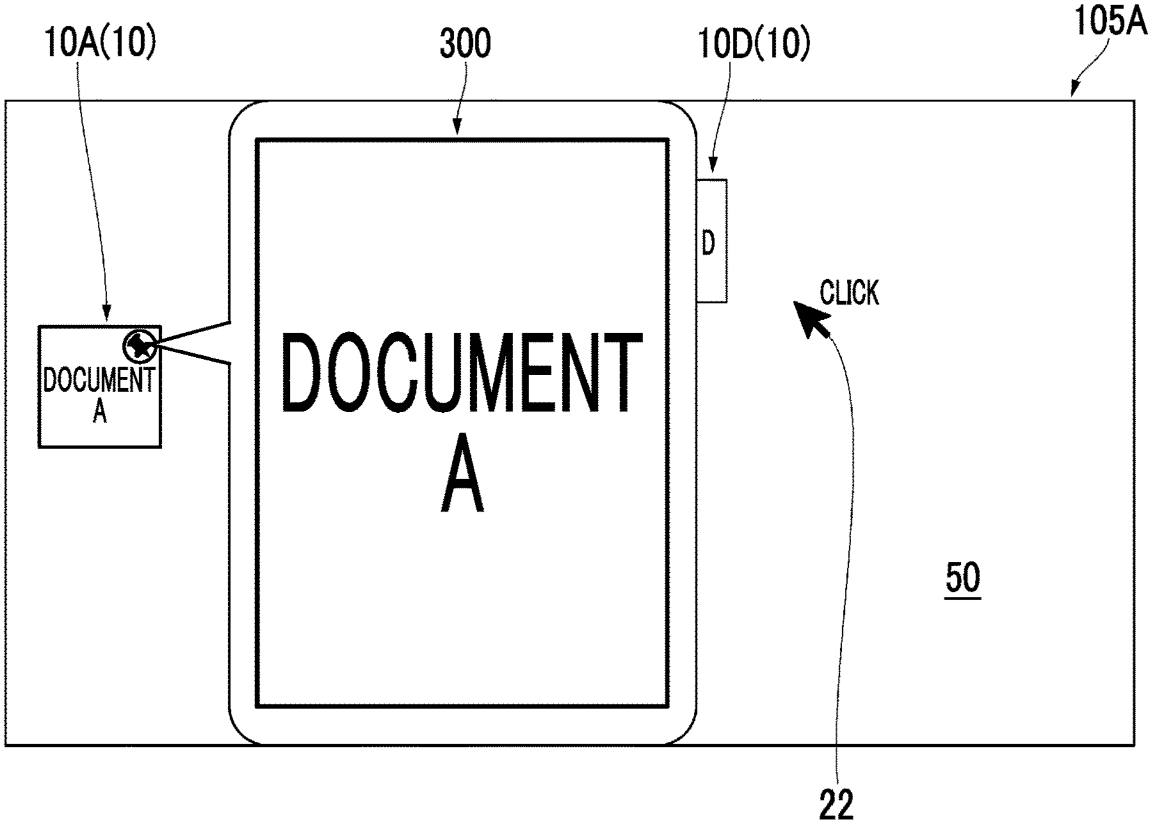
FIGS. 8A and 8B are diagrams illustrating display examples in the display unit of the display device.
Figure 8B:
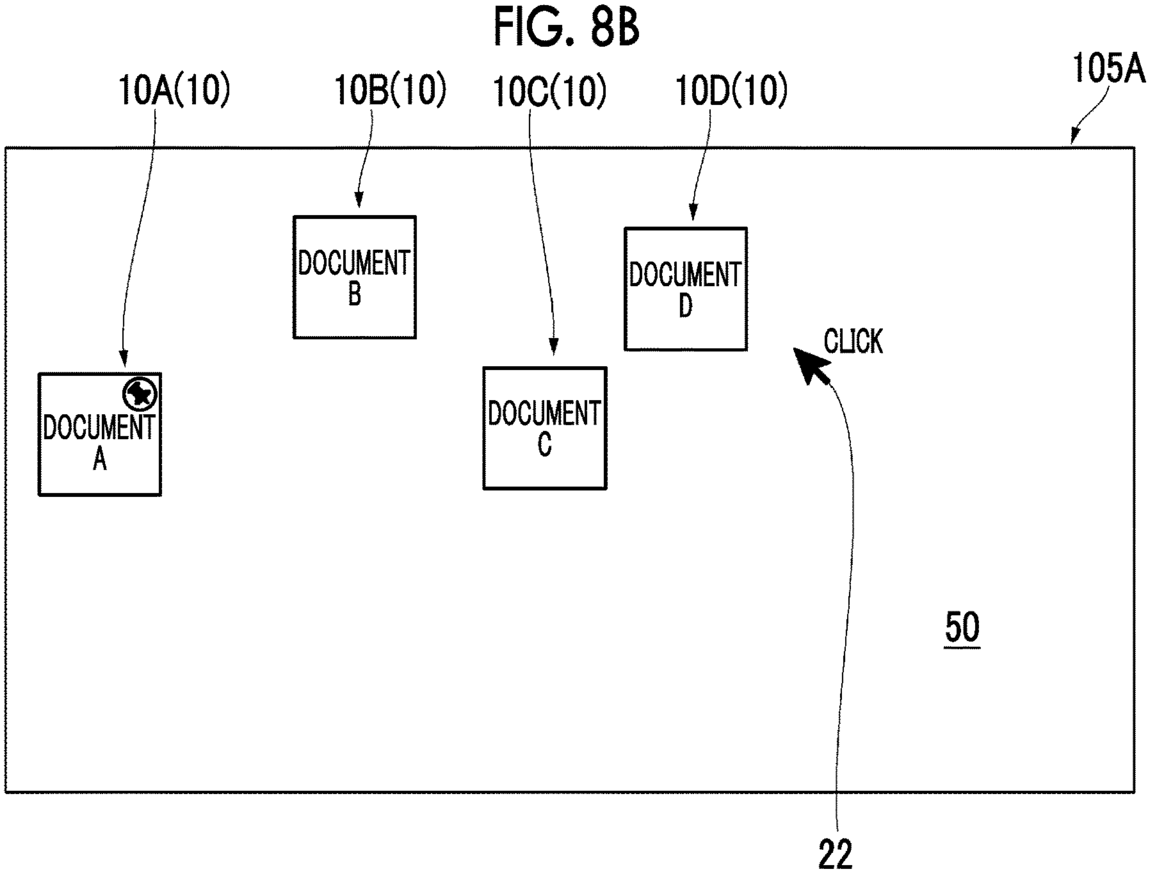

In the present exemplary embodiment, as illustrated in FIG. 8A, even in a case where the user selects a location in the display unit 105A in which the large image 300 is not displayed and the other document image 10 is not displayed (hereinafter, referred to as "non-display location 50"), the large image 300 is hidden as illustrated in FIG. 8B.

Figure 9A:
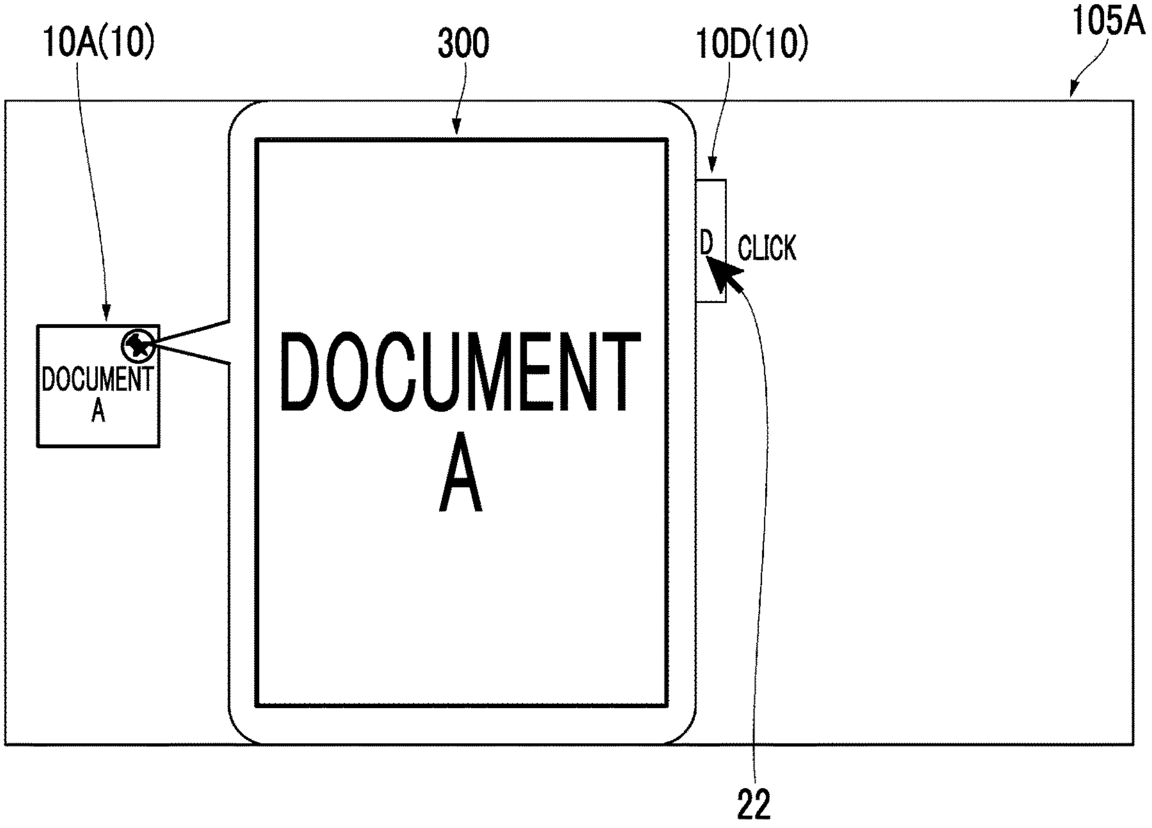
FIGS. 9A and 9B are diagrams illustrating display examples in the display unit of the display device.
Figure 9B:
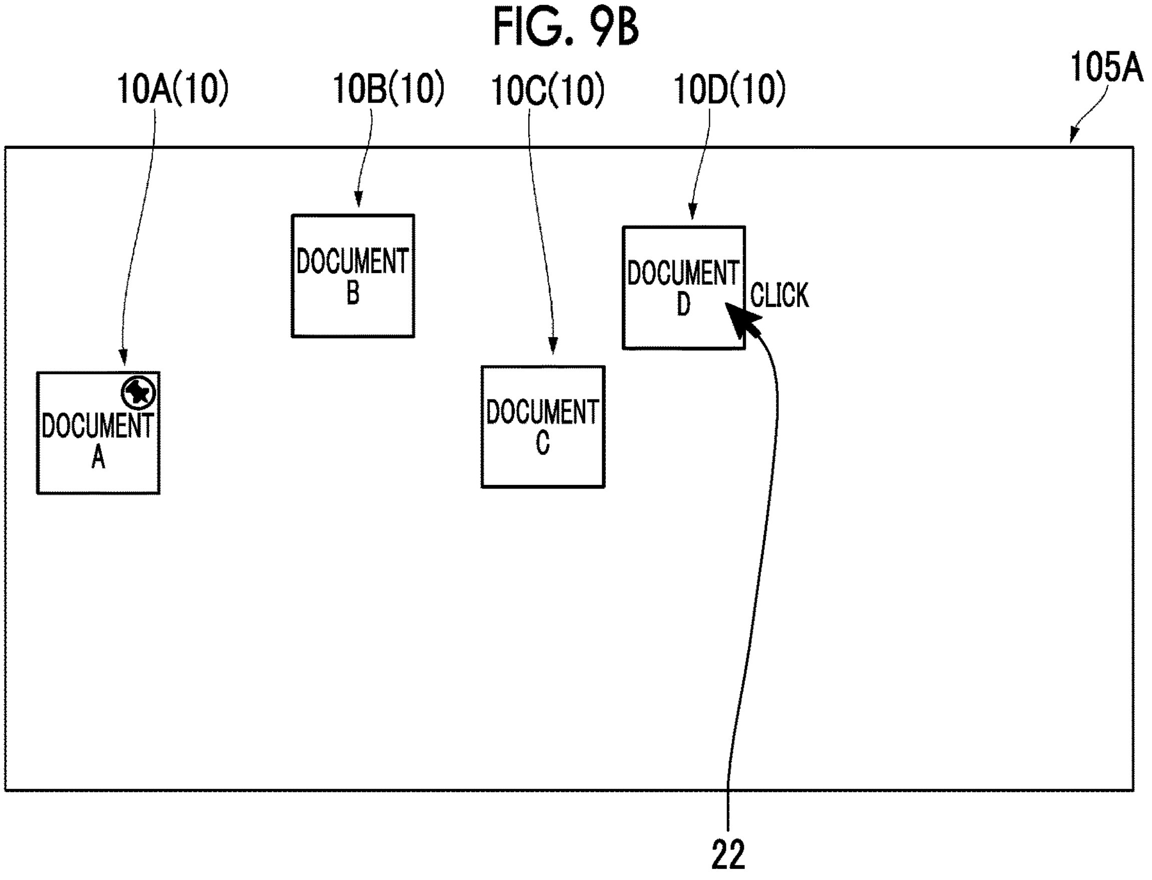

Further, in the present exemplary embodiment, as illustrated in FIG. 9A, in a state where the large image 300 is displayed, even in a case where the user selects the document image 10D of which a part is located behind the large image 300, the large image 300 is temporarily hidden as illustrated in FIG. 9B.

Figure 10A:
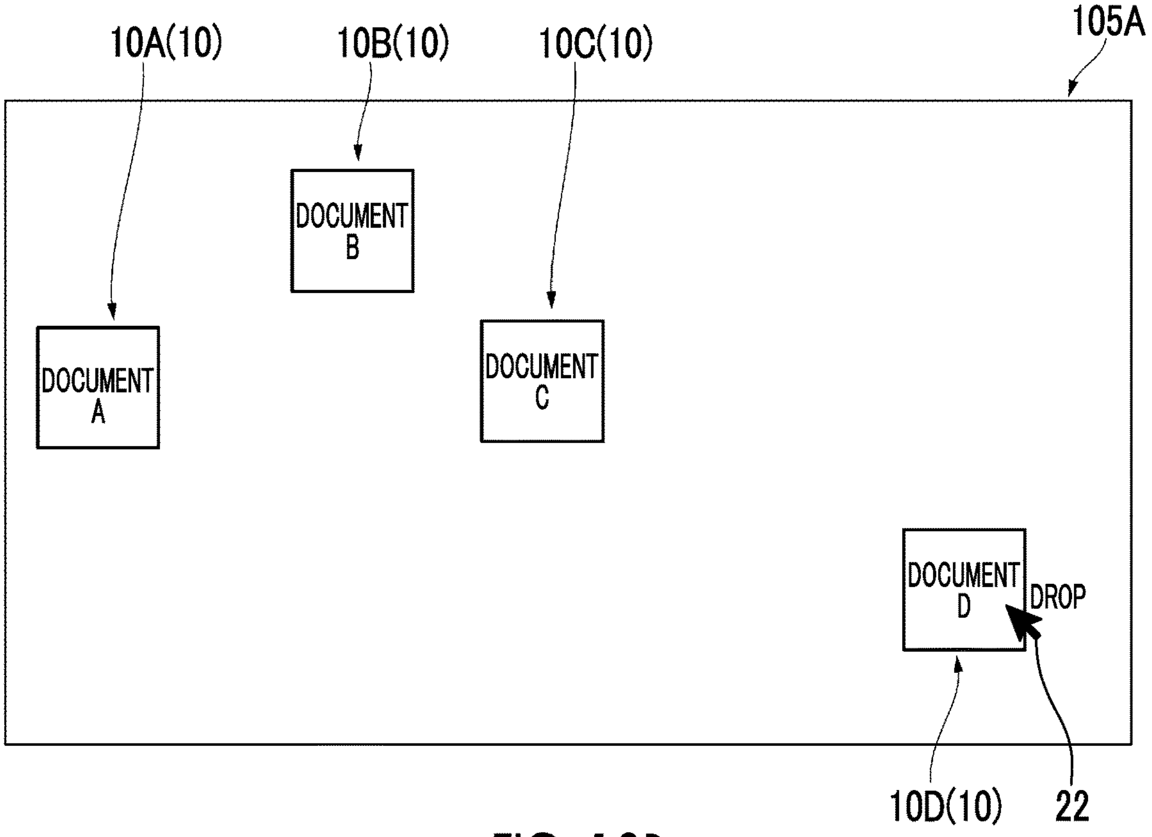
FIGS. 10A and 10B are diagrams illustrating display examples in the display unit of the display device.
Figure 10B:
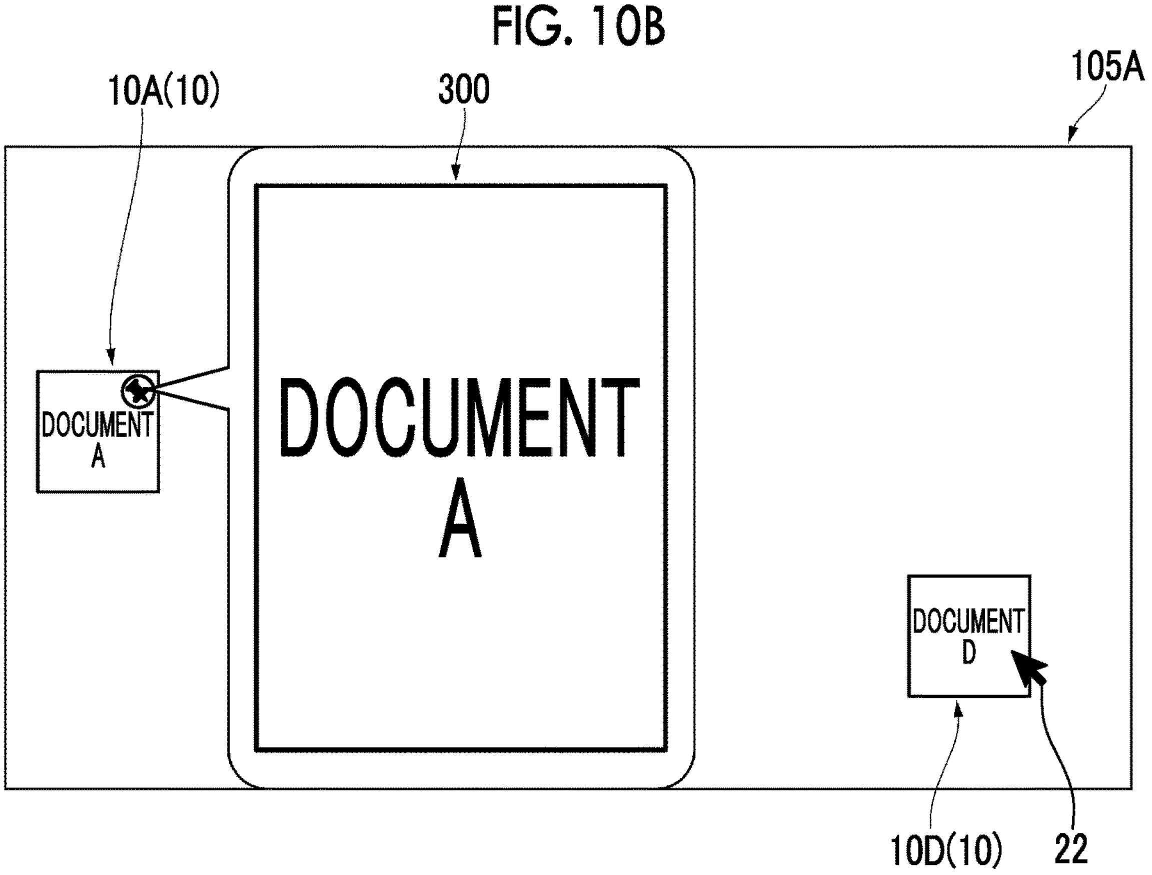

Then, in this case, as illustrated in FIG. 10A, in a case where the user moves and drops the document image 10D to another location, the large image 300 is redisplayed as illustrated in FIG. 10B.

In other words, even in this case, in a case where the user deselects the document image 10D, the large image 300 is redisplayed.

Second Display Example

Figure 11A:
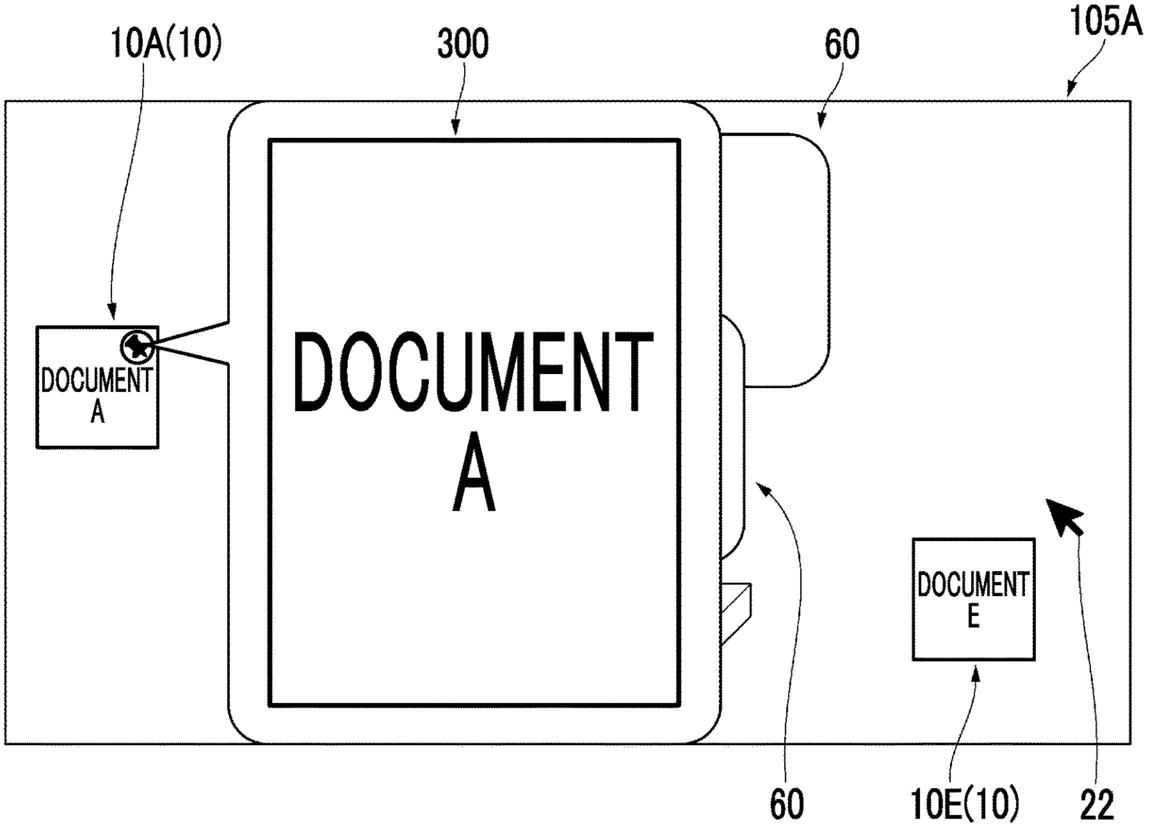
FIGS. 11A and 11B are diagrams illustrating display examples in the display unit of the display device.
Figure 11B:
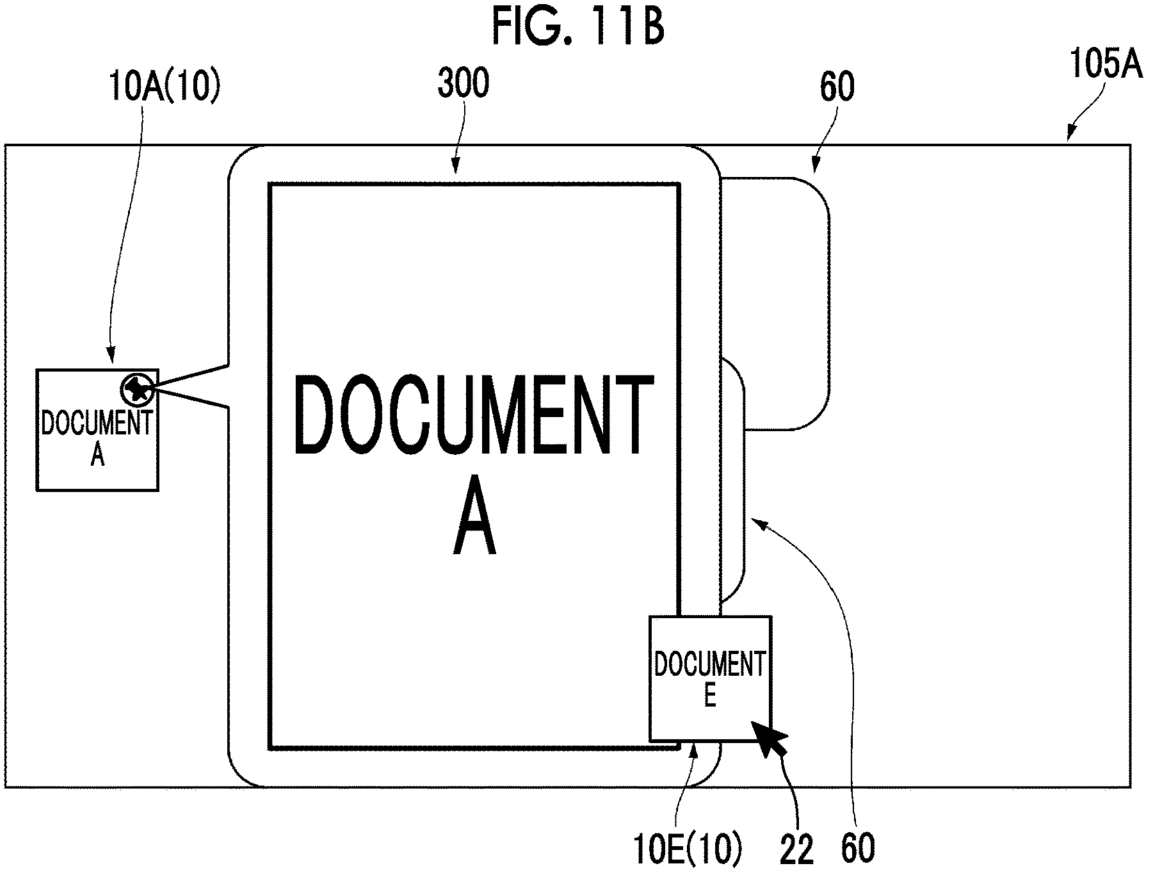

FIGS. 11A and 11B are diagrams illustrating other display examples in the display unit 105A.

In this display example, as illustrated in FIG. 11A, behind the large image 300 displayed on the display unit 105A, there is a storage image 60 that is an image used for storing information in a specific storage area of the information storage device 102 (see FIG. 1).

In the present exemplary embodiment, in a case where the document image 10 is displayed in a state of being superimposed on the storage image 60, the document represented by the document image 10 is stored in the recording area associated with the storage image 60.

In the present exemplary embodiment, in a case where the storage image 60 is present behind the large image 300, the display of the large image 300 is changed such that the user can grasp the presence of the storage image 60.

Figure 12A:
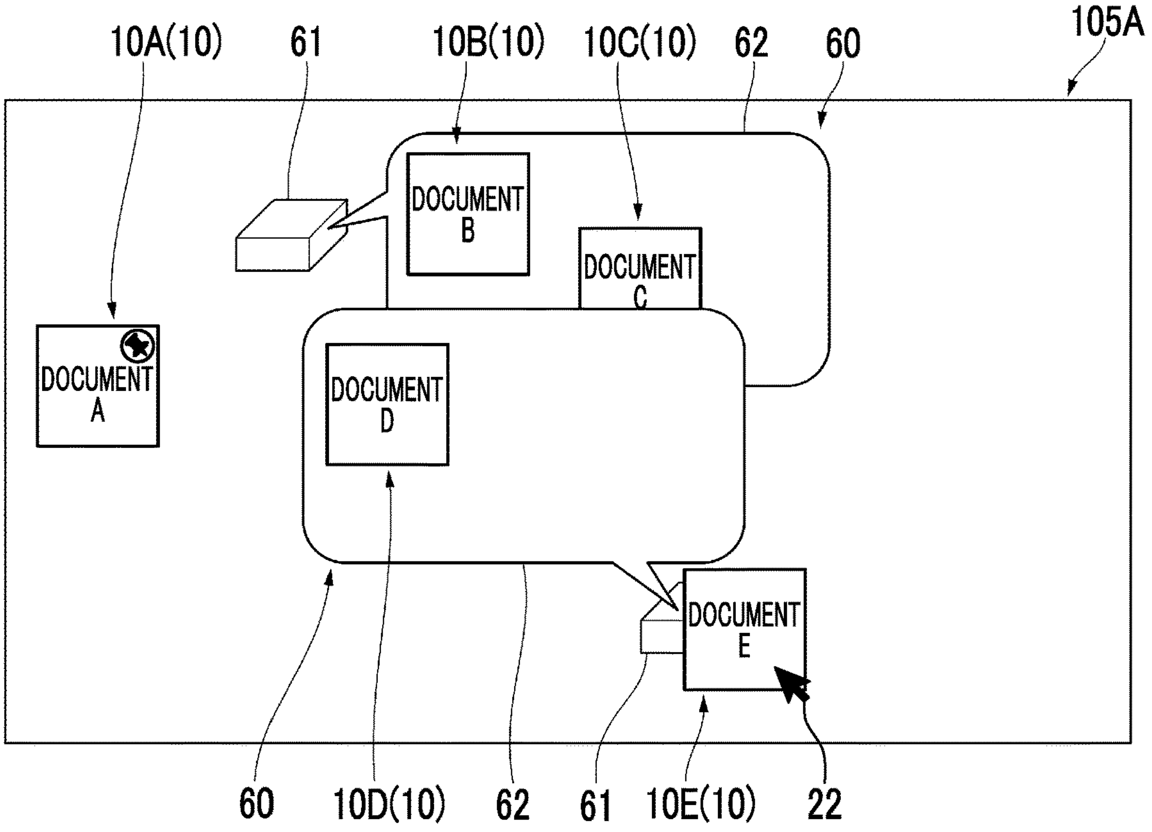
FIGS. 12A and 12B are diagrams illustrating display examples in the display unit of the display device.

Specifically, in this example, as in the above, for example, as illustrated in FIGS. 11A and 11B, in a case where the document image 10E around the large image 300 is moved to the display location of the large image 300, the large image 300 is temporarily hidden as illustrated in FIG. 12A.

Thus, the storage image 60 can be visually recognized, and the user can refer to the storage image 60 located behind the large image 300.

Figure 12B:
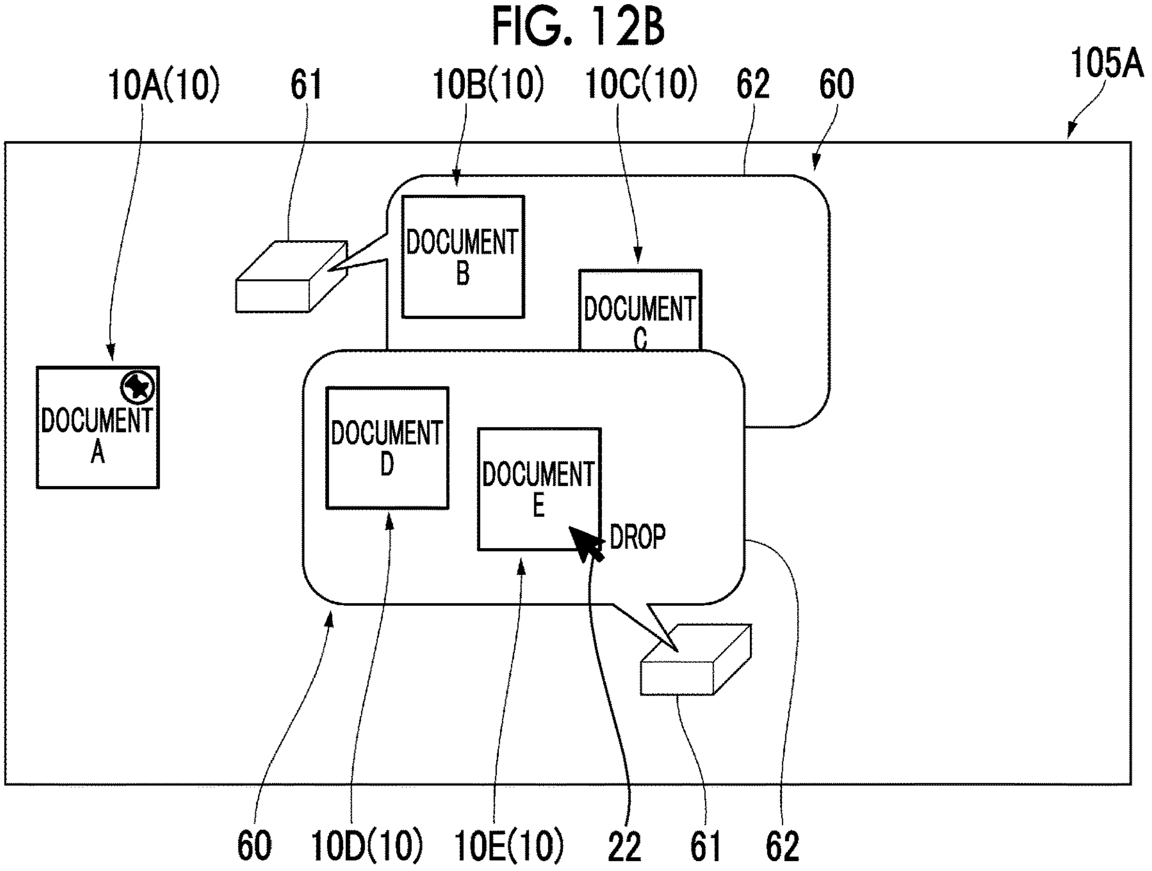
Figure 13:
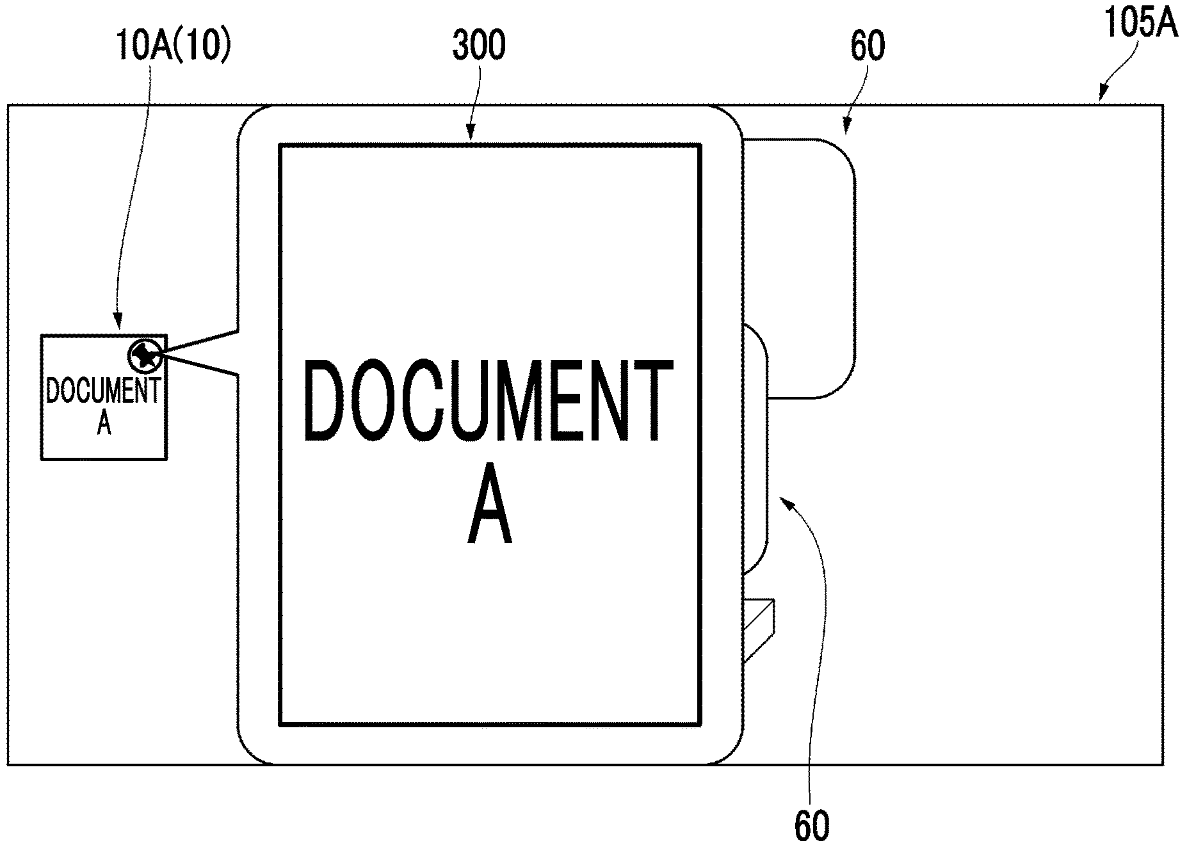
FIG. 13 is a diagram illustrating display examples in the display unit of the display device.

Then, as illustrated in FIG. 12B, in a case where the user drops the document image 10E to the storage image 60, the large image 300 is redisplayed as illustrated in FIG. 13. In other words, in a case where the user deselects the document image 10E, the large image 300 is redisplayed, as illustrated in FIG. 13.

As illustrated in FIG. 12A, the storage image 60 includes a storage unit image 61 that is an image illustrating the storage unit of the document represented by the document image 10, and a document display image 62 for displaying the document stored in the storage unit.

The display examples illustrated in FIGS. 11A to 13 illustrate a case where the large image 300 is redisplayed in a case where the document image 10E is dropped to the document display image 62 (see FIGS. 12A and 12B).

Third Display Example

FIGS. 14A to 16 are diagrams illustrating other display examples on the display unit 105A.

Figure 14A:
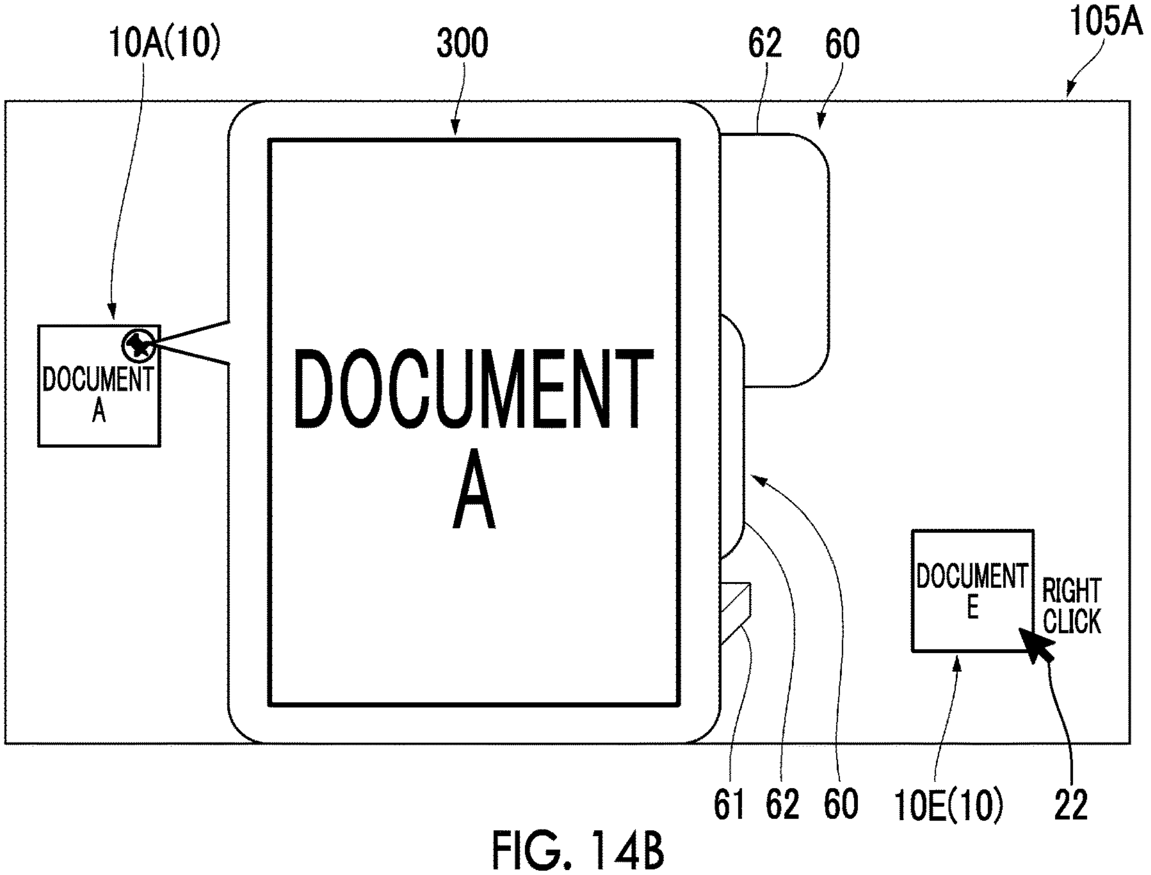
FIGS. 14A and 14B are diagrams illustrating display examples in the display unit of the display device.

FIG. 14A illustrates a case where the user further right-clicks the mouse in a state where the user selects the document image 10E. In other words, a case is illustrated where the user further right-clicks the mouse in a state where the user left-clicks the mouse.

Figure 14B:
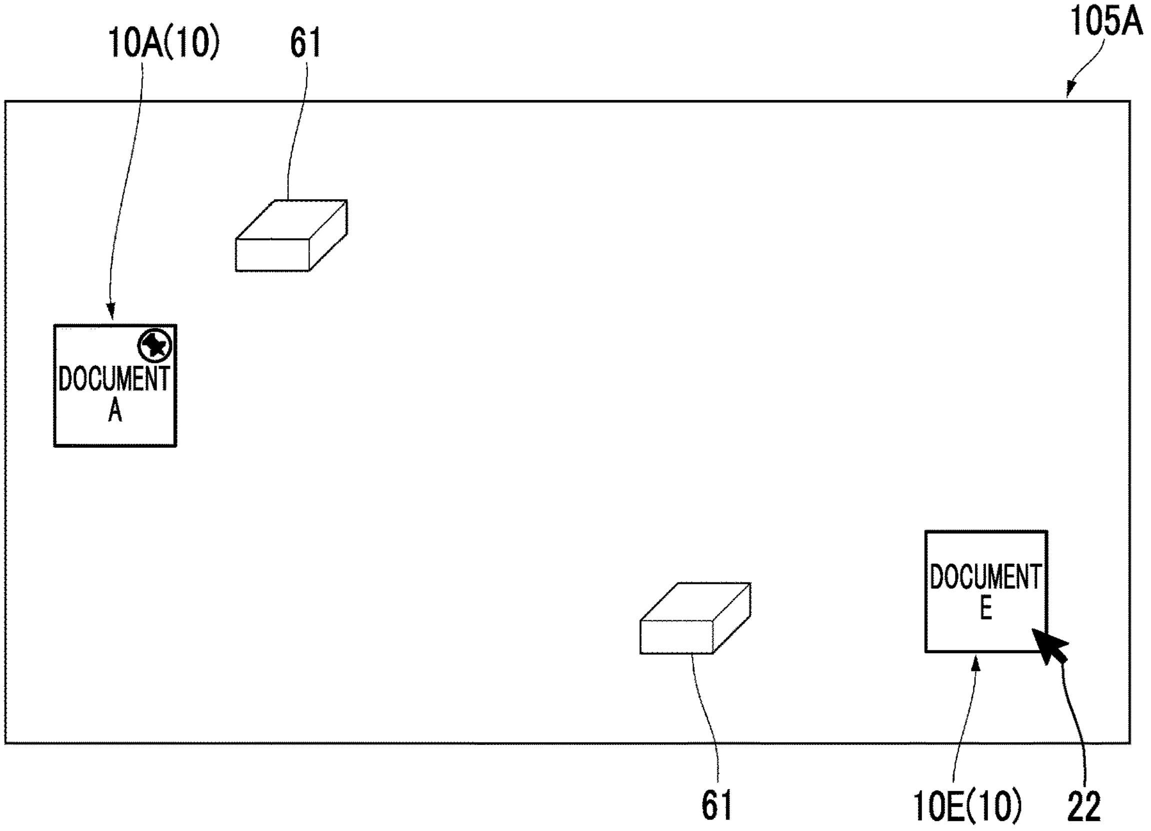

Even in this case, as illustrated in FIG. 14B, the display of the large image 300 is changed, and the large image 300 is temporarily hidden. Further, in this display example, the document display image 62 (see FIG. 14A) that constitutes a part of the storage image 60 is also temporarily hidden, and the state behind the document display image 62 can be grasped.

Here, the case is illustrated where the display of the large image 300 is changed in a case where the user further performs an operation on the mouse in a state where the user selects the document image 10E by using the mouse which is an example of a device used for selecting the document image 10E.

More specifically, in this example, a case is illustrated where the display of the large image 300 is changed in a case where the user presses the right button of the mouse in a state where the user continuously presses the left button of the mouse.

In other words, in this example, the case is illustrated where the display of the large image 300 is changed in a case where the user further performs an operation on the right button which is an example of a part-to-be-operated provided on the mouse in a state where the user selects the document image 10E by using the mouse.

Figure 15A:
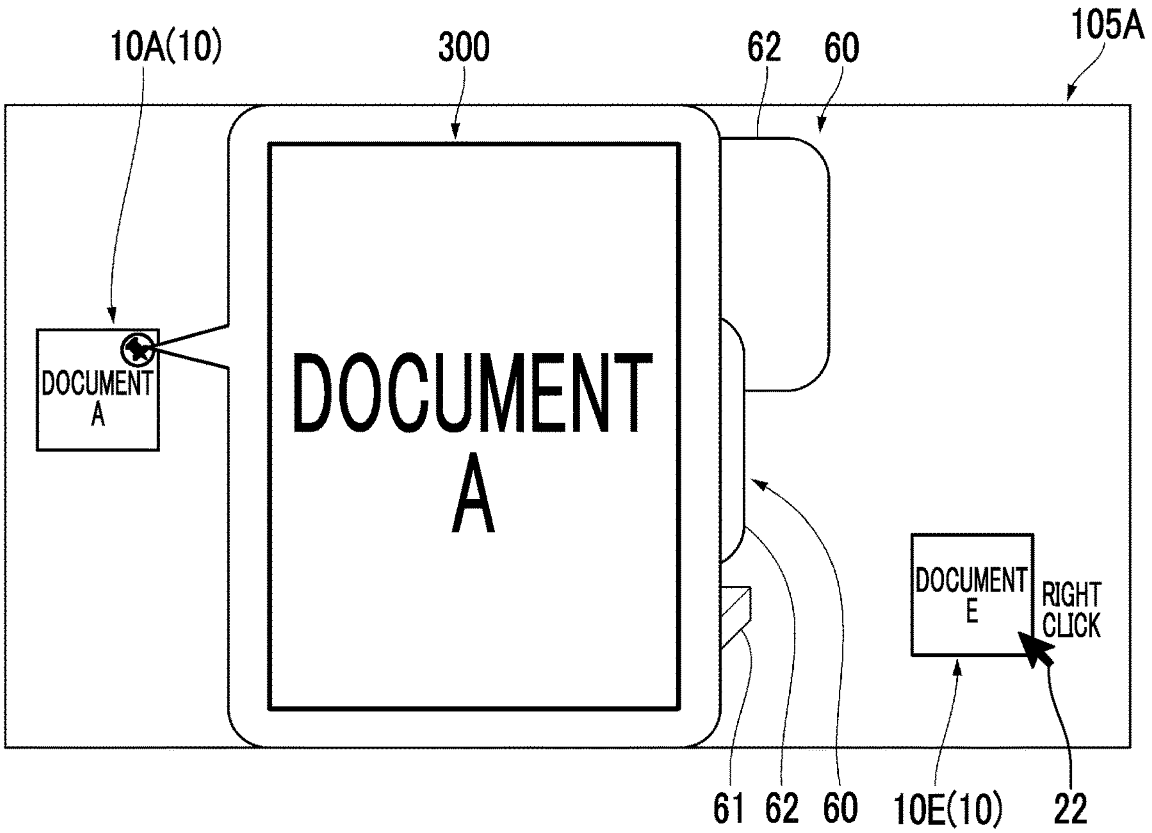
FIGS. 15A and 15B are diagrams illustrating display examples in the display unit of the display device.

After that, in this processing example, in a case where the user presses the right button of the mouse again in a state where the user continuously presses the left button, as illustrated in FIG. 15A, the large image 300 and the document display image 62 are redisplayed.

Figure 15B:
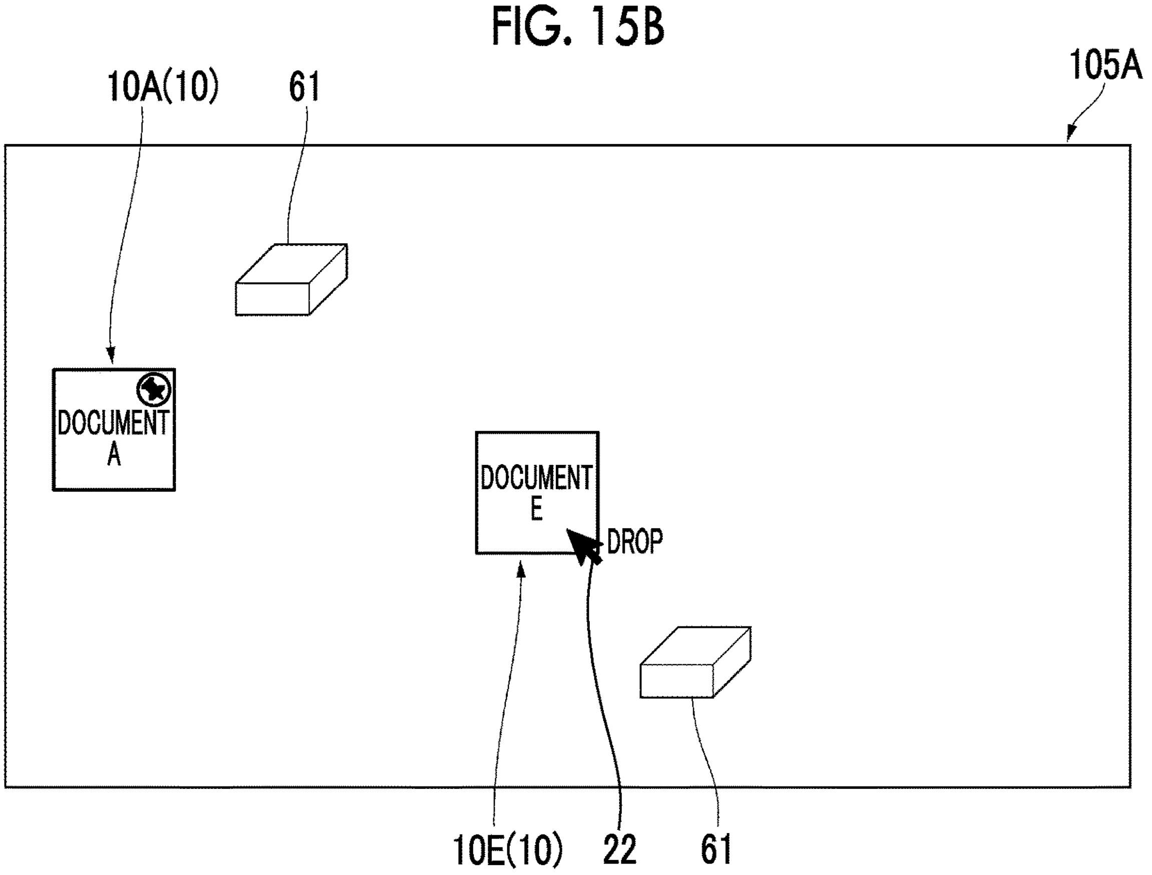
Figure 16:
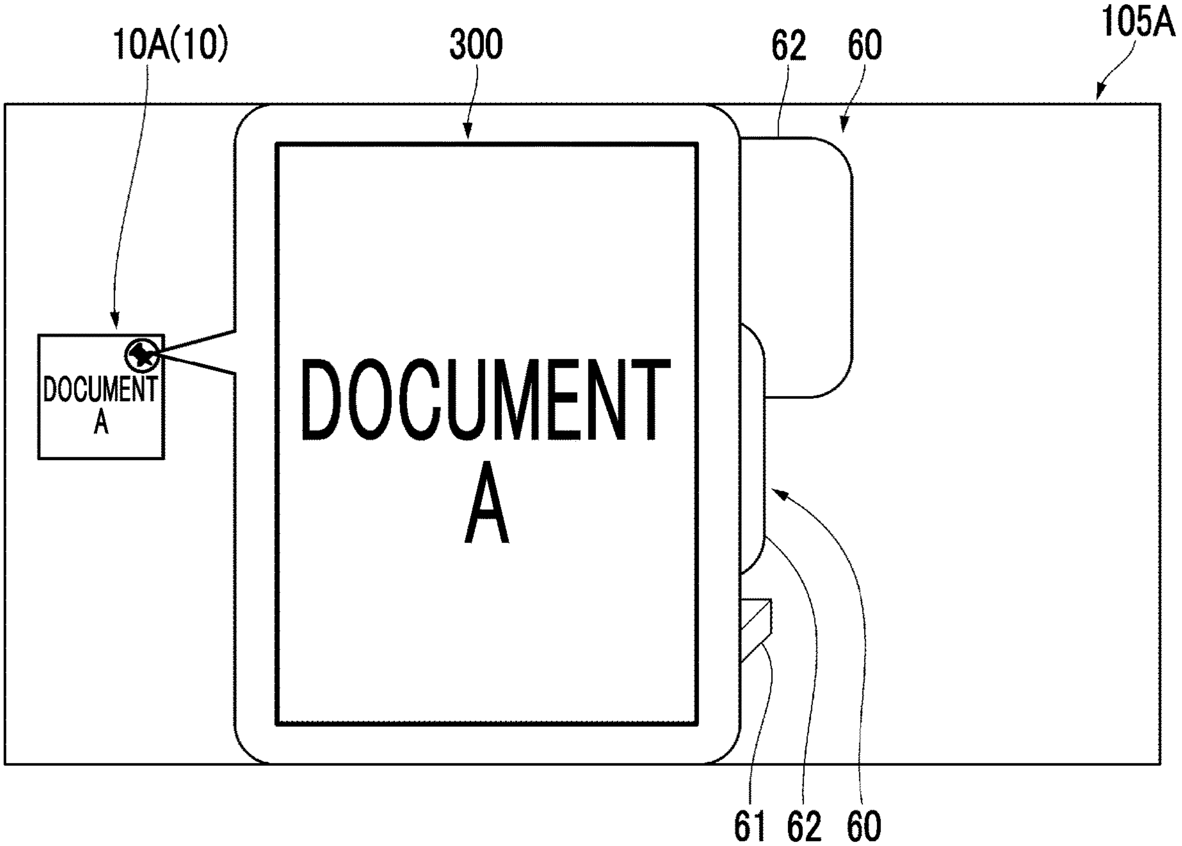
FIG. 16 is a diagram illustrating a display example in the display unit of the display device.

Further, in the present exemplary embodiment, after the large image 300 and the document display image 62 are hidden by the user pressing the right button, even in a case where the user drops the document image 10E as illustrated in FIG. 15B, the large image 300 and the document display image 62 are redisplayed, as illustrated in FIG. 16.

In other words, in the present exemplary embodiment, after the large image 300 and the document display image 62 are hidden, in a case where the user stops the operation of the left button of the mouse and deselects the document image 10E, the large image 300 and the document display image 62 are redisplayed.

Here, as described above, the case has been described as an example in which the large image 300 and the document display image 62 are hidden in a case where the right button of the mouse is further operated in a state where the document image 10E is selected.

Incidentally, without limited to this, in a case where the user operates a part-to-be-operated provided on a device other than the mouse, such as a key provided on the keyboard, in a state where the document image 10E is selected, the large image 300 and the document display image 62 may be hidden.

In other words, in a state where the user operates one device and selects the document image 10E, in a case where the user operates another device, the large image 300 and the document display image 62 may be hidden.

Further, regarding the redisplay of the large image 300 and the document display image 62, in a state where the user operates one device and selects the document image 10E, in a case where the user operates another device, the large image 300 and the document display image 62 may be redisplayed.

Fourth Display Example

Figure 17A:
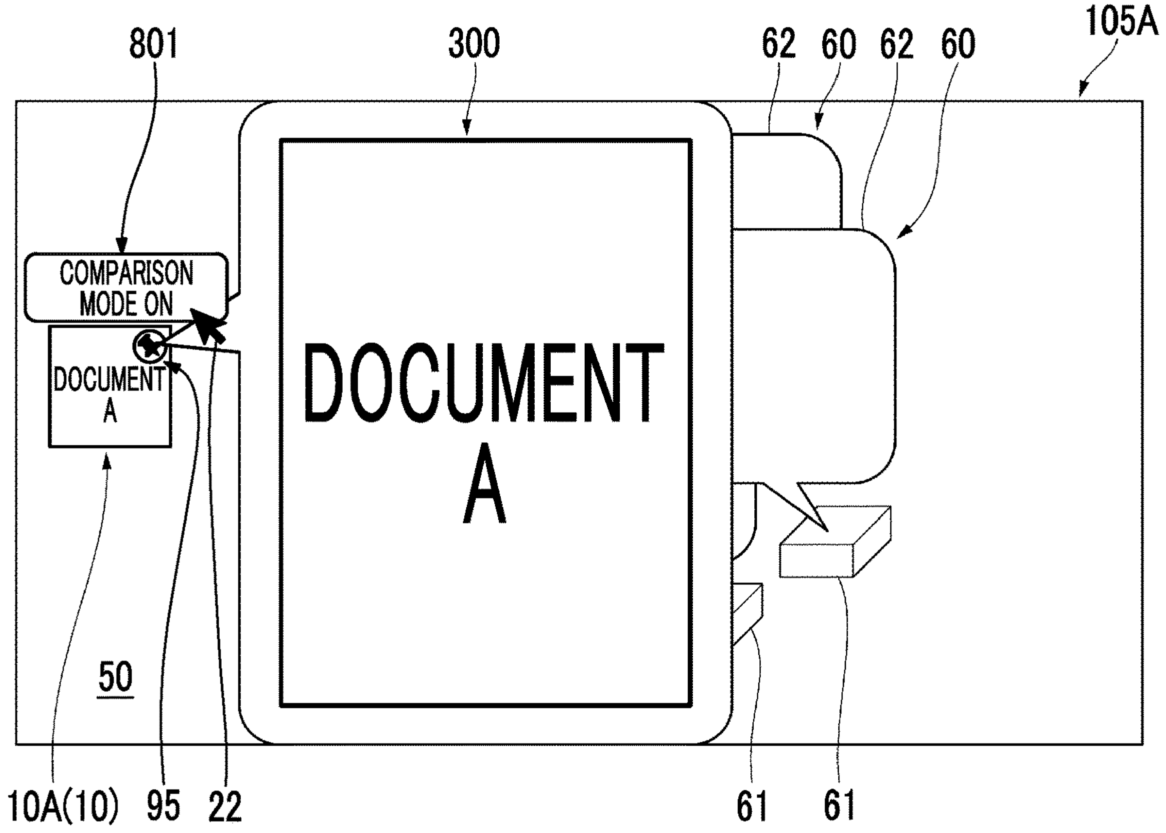
FIGS. 17A and 17B are diagrams illustrating display examples in the display unit of the display device.

In FIG. 17A, similarly to the above, the user performs an operation of selecting the selection portion 95 of the document image 10A, and the large image 300 is displayed. Further, in this display example, the storage image 60 is present behind the large image 300.

In this display example, as will be described later, in a case where the user performs an operation on the back image 30, which is an image displayed behind the large image 300, the display of the large image 300 is changed.

More specifically, in this processing example, in a case where the user performs an operation of selecting the back image 30 located behind the large image 300, the display of the large image 300 is changed.

In this processing example as well, in a case where the user selects the selection portion 95 of the document image 10A, the display of the large image 300 is maintained. Further, in this processing example, in a case where the user selects the selection portion 95 of the document image 10A, a selection item 801 "comparison mode ON" is displayed on the display unit 105A as illustrated in FIG. 17A.

Figure 17B:
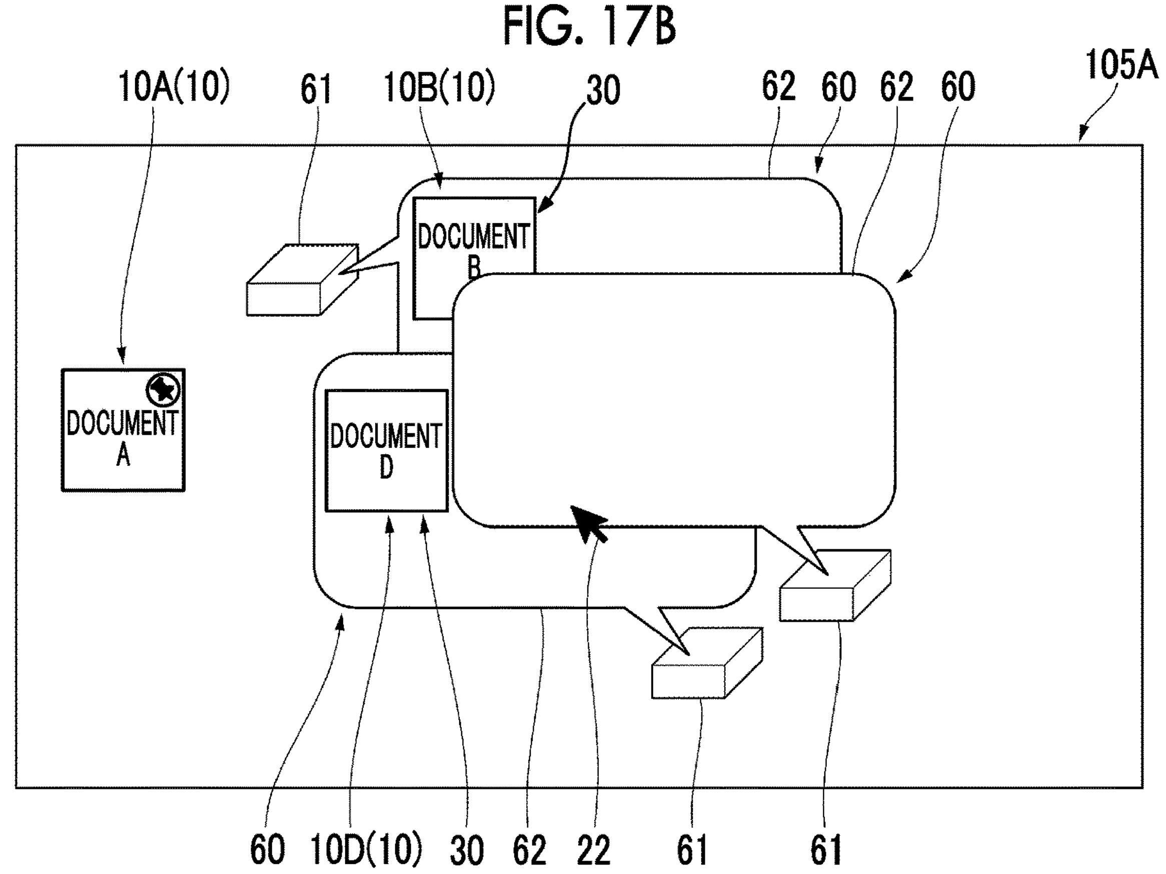

Then, in this processing example, in a case where the user selects the selection item 801 as illustrated in FIG. 17B, the display of the large image 300 is changed and the large image 300 is hidden.

Thus, the document image 10B and the document image 10D, that are examples of the back image 30 displayed behind the large image 300, can be visually recognized. In addition, the storage image 60 can be visually recognized.

Here, the case where the large image 300 is hidden is described as an example, but as in the above, in changing the display of the large image 300, one process or two or more processes among hiding, changing the density, changing the size, and changing the display position may be performed.

Figure 18A:
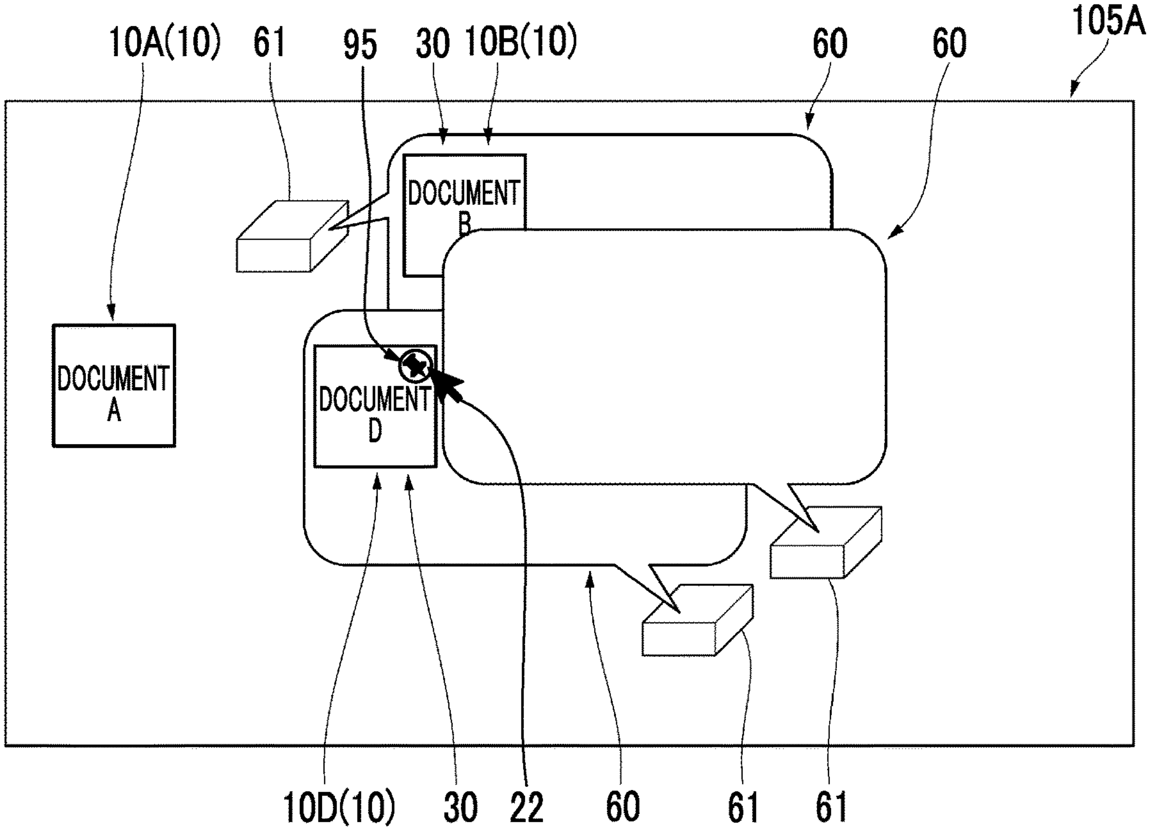
FIGS. 18A and 18B are diagrams illustrating display examples in the display unit of the display device.

Then, in this example, as illustrated in FIG. 18A, the user moves the pointer 22 to the selection portion 95 of the document image 10D.

Figure 18B:
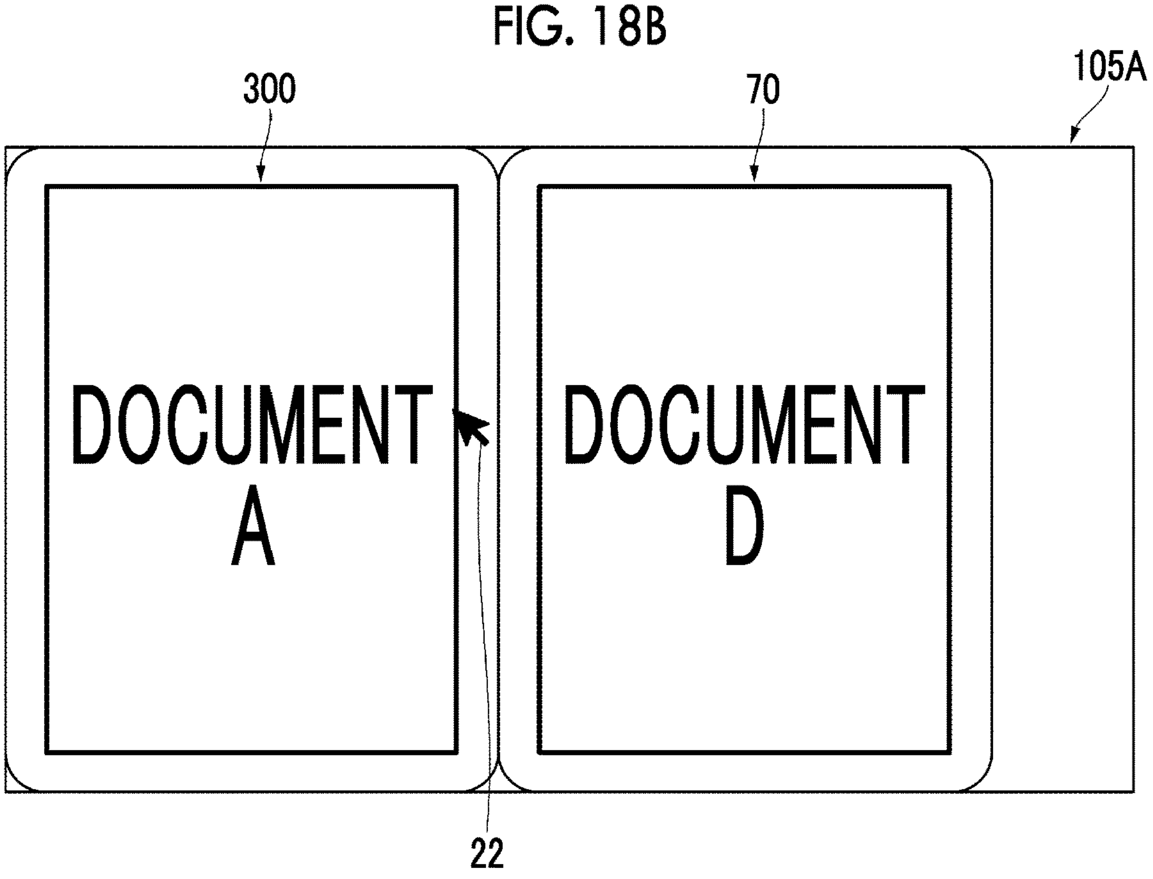

In a case where the pointer 22 is moved to the selection portion 95 of the document image 10D, as illustrated in FIG. 18B, a corresponding image 70 larger than the document image 10D (see FIG. 18A) that is an example of the back image 30, and corresponding to the document image 10D, is displayed on the display unit 105A.

In this example, the shape of the document image 10D (see FIG. 18A) and the shape of the corresponding image 70 corresponding to the document image 10D are similar to each other, but without being limited to this, the shape of the document image 10D and the shape of the corresponding image 70 may be different.

Further, as described above, the corresponding image 70 may be an image obtained by simply enlarging the document image 10D, or may be an image displayed by opening the file represented by the document image 10D.

Further, in this processing example, as illustrated in FIG. 18B, in addition to the display of the corresponding image 70, the display of the large image 300 which is in the state after the display change is changed.

Specifically, in this processing example, in a case where the user moves the pointer 22 to the selection portion 95 of the document image 10D (see FIG. 18A), as illustrated in FIG. 18B, the large image 300 that has been in the hidden state is redisplayed.

Then, the user compares the large image 300 with the corresponding image 70. In other words, in this case, the user compares the document images 10, which have been originally in a small state, with each other in an enlarged state.

This makes it easier for the user to compare documents. The user may want to check the contents in a case of comparing the documents, and as in the present exemplary embodiment, in a case where the image is enlarged, the user can easily compare the documents.

In this processing example, the large image 300 is automatically redisplayed. Thus, the large image 300 is redisplayed without the user performing a dedicated operation for redisplaying the large image 300.

Further, in this processing example, as illustrated in FIG. 18B, the large image 300 which is redisplayed and the corresponding image 70 are displayed side by side.

Further, in this processing example, the large image 300 and the corresponding image 70 are displayed such that the size of the large image 300 after the redisplay is the same as the size of the corresponding image 70.

Further, in this display example, a location where the large image 300 is redisplayed (see FIG. 18B) and a location where the large image 300 has been displayed before being redisplayed (see FIG. 17A) are different. Thus, interference between the large image 300 after the redisplay and the corresponding image 70 can be avoided.

Further, as described above, in changing the display of the large image 300, one or more processes among hiding, changing (decrease) the density, changing (reduce) the size, and changing the display position may be performed.

In displaying the large image 300 in the original state before the display of the large image 300 is changed, the reverse processes of the one or more processes are performed, and one or more processes among redisplay, changing (increase) the density, changing (enlargement) the size, and changing the display position are performed.

Figure 19A:
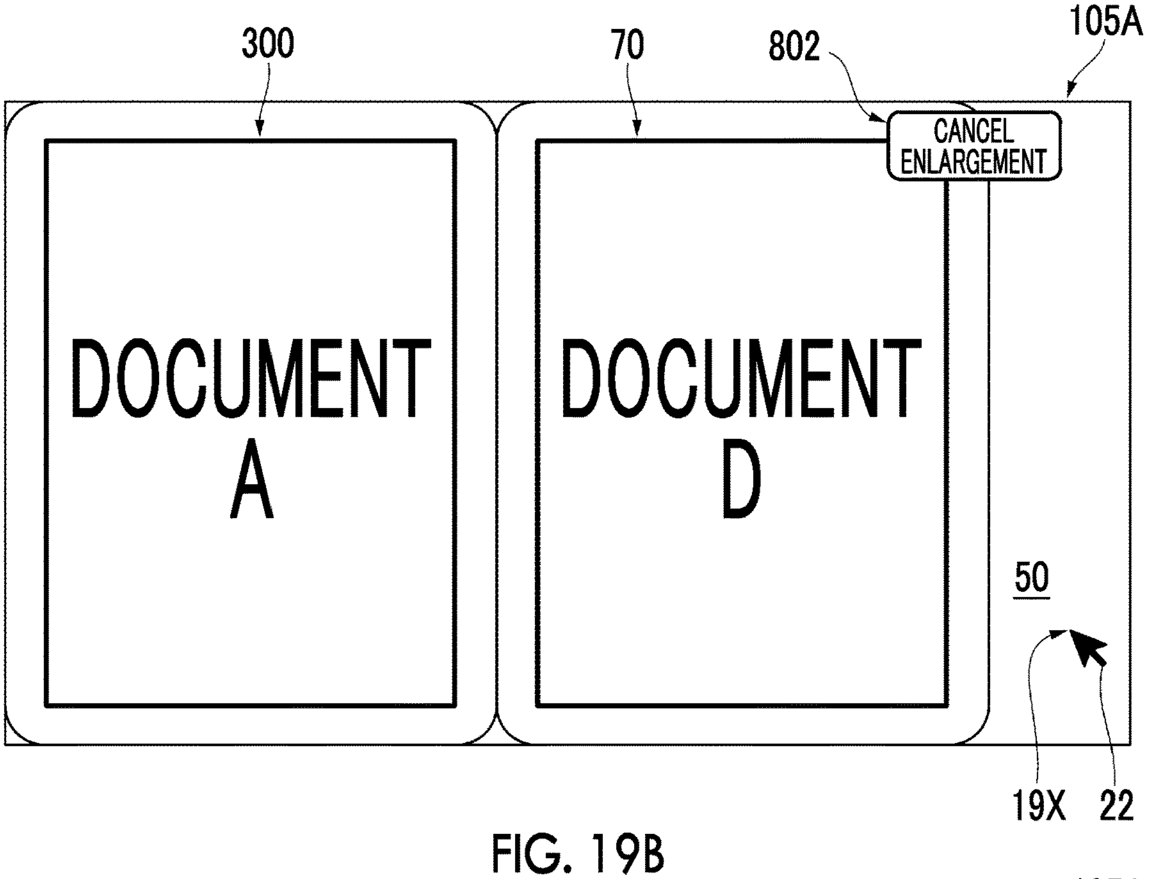
FIGS. 19A and 19B are diagrams illustrating display examples in the display unit of the display device.

Further, in the present exemplary embodiment, after the large image 300 and the corresponding image 70 are displayed side by side, as illustrated in FIG. 19A, a selection item 802 "cancel enlargement" is displayed on the display unit 105A.

Figure 19B:
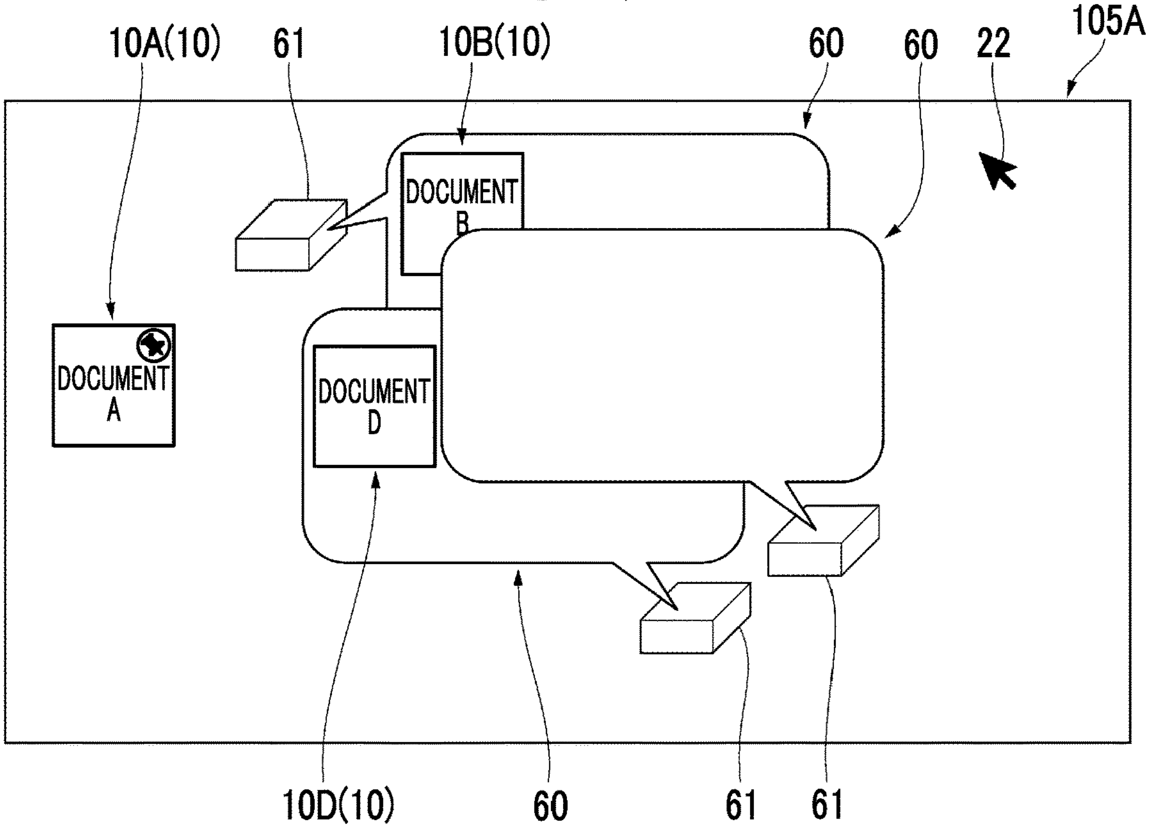

Then, in a case where the user selects the selection item 802 "cancel enlargement", the large image 300 and the corresponding image 70 are hidden as illustrated in FIG. 19B.

In addition, in the present exemplary embodiment, even in a case where the user selects the document hidden location 50 such as the location indicated by the reference numeral 19X in FIG. 19A, the large image 300 and the corresponding image 70 are similarly hidden.

Figure 20A:
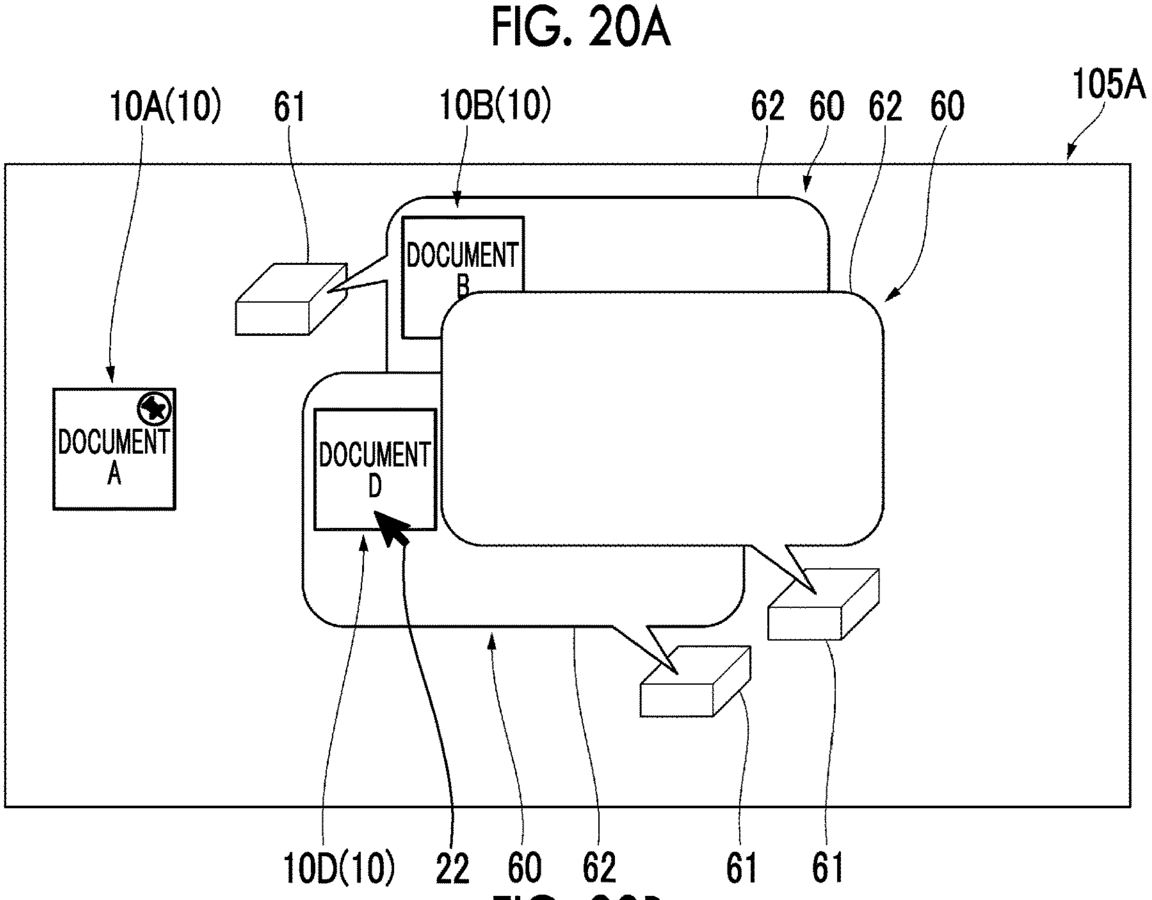
FIGS. 20A and 20B are diagrams illustrating display examples in the display unit of the display device.
Figure 20B:
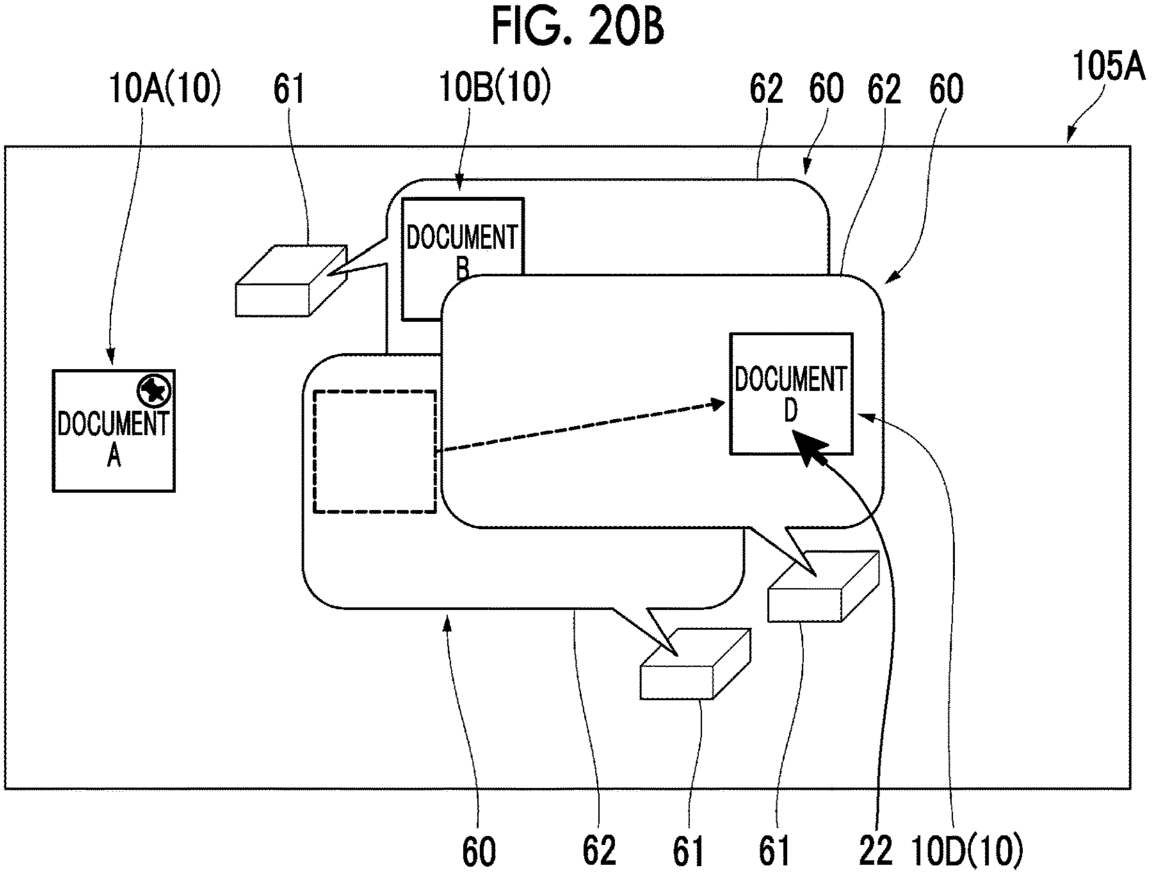

After that, in this example, as illustrated in FIGS. 20A and 20B, the user moves the document image 10D from the location where one document display image 62 is displayed to the location where the other document display image 62 is displayed.

Figure 21A:
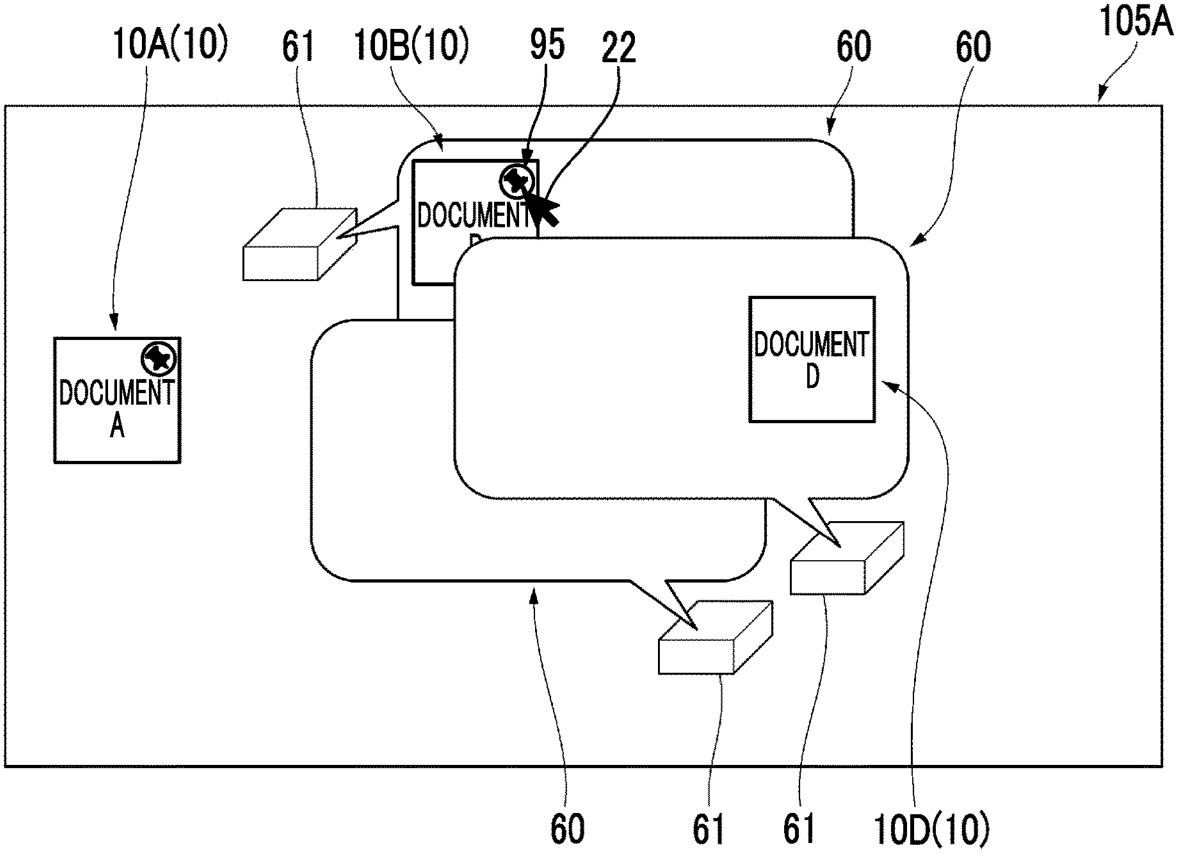
FIGS. 21A and 21B are diagrams illustrating display examples in the display unit of the display device.
Figure 21B:
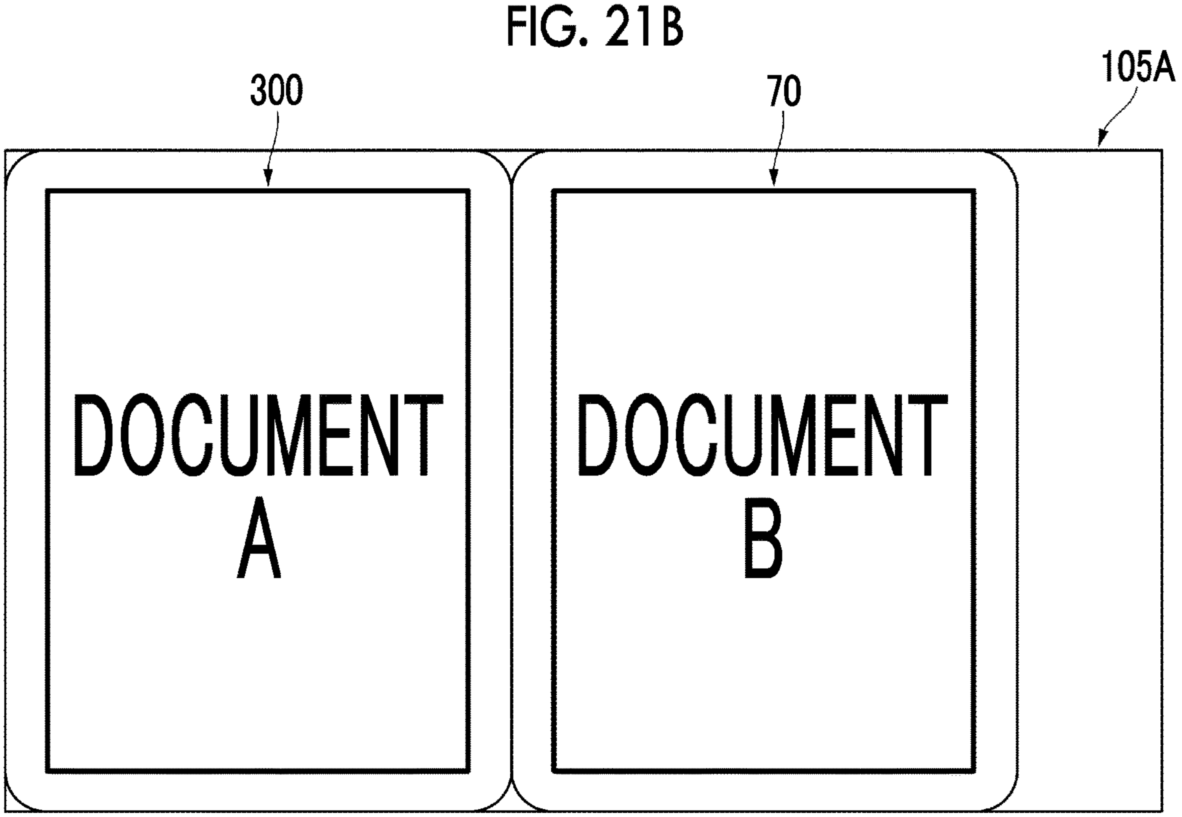

Next, in this processing example, as illustrated in FIG. 21A, the user moves the pointer 22 to the selection portion 95 of the document image 10B.

Thus, even in this case, the same processing as described above is executed, and as illustrated in FIG. 21B, the large image 300 is redisplayed, and the corresponding image 70 corresponding to the document image 10B is displayed.

Even in this case, the large image 300 and the corresponding image 70 are displayed side by side.

Figure 22A:
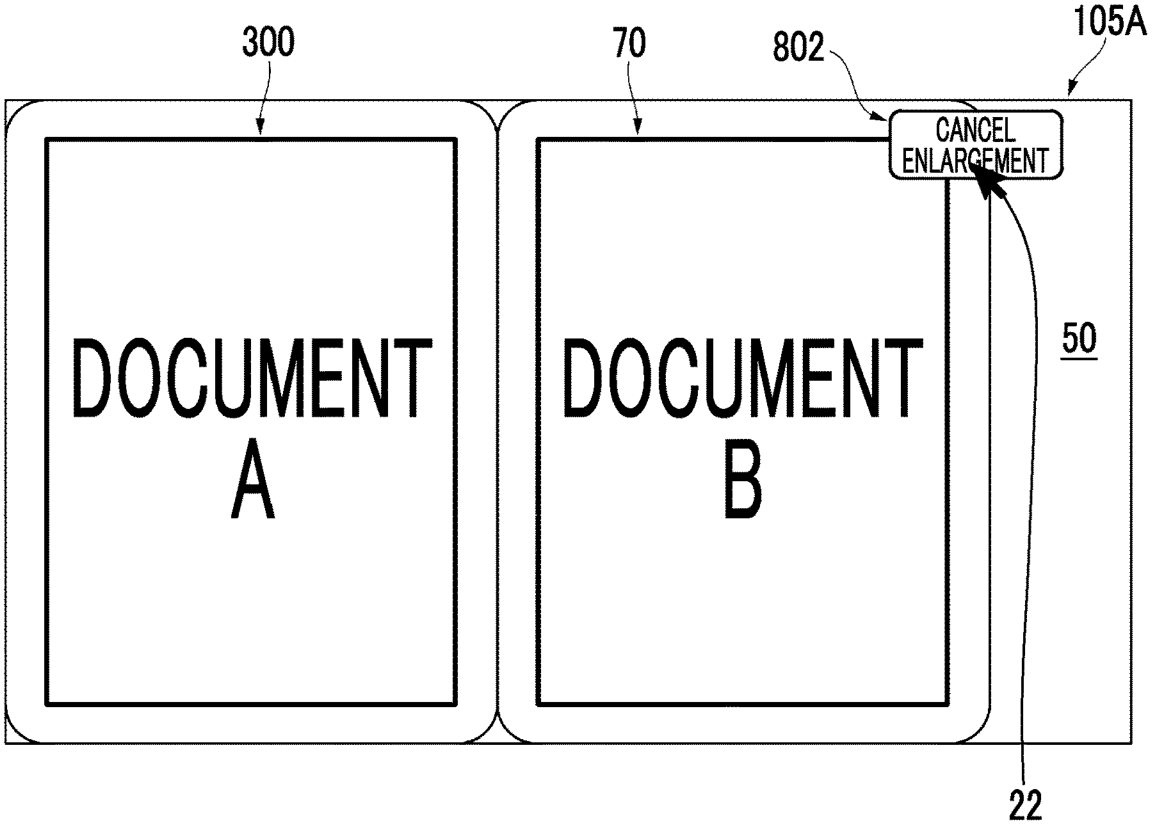
FIGS. 22A and 22B are diagrams illustrating display examples in the display unit of the display device.
Figure 22B:
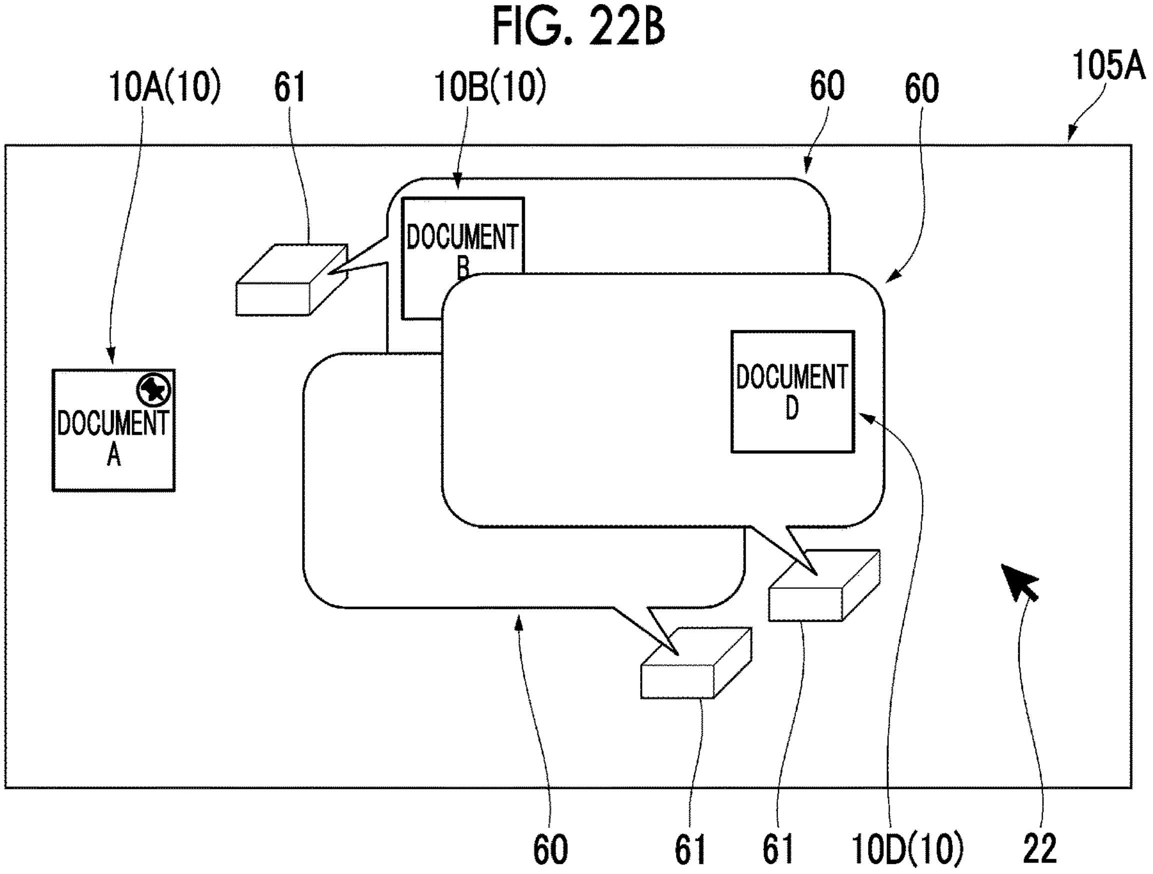

After that, in the same manner as described above, in a case where the user selects the selection item 802 "cancel enlargement" (see FIG. 22A) or selects the document hidden location 50, the large image 300 and the corresponding image 70 are hidden, as illustrated in FIG. 22B.

Figure 23A:
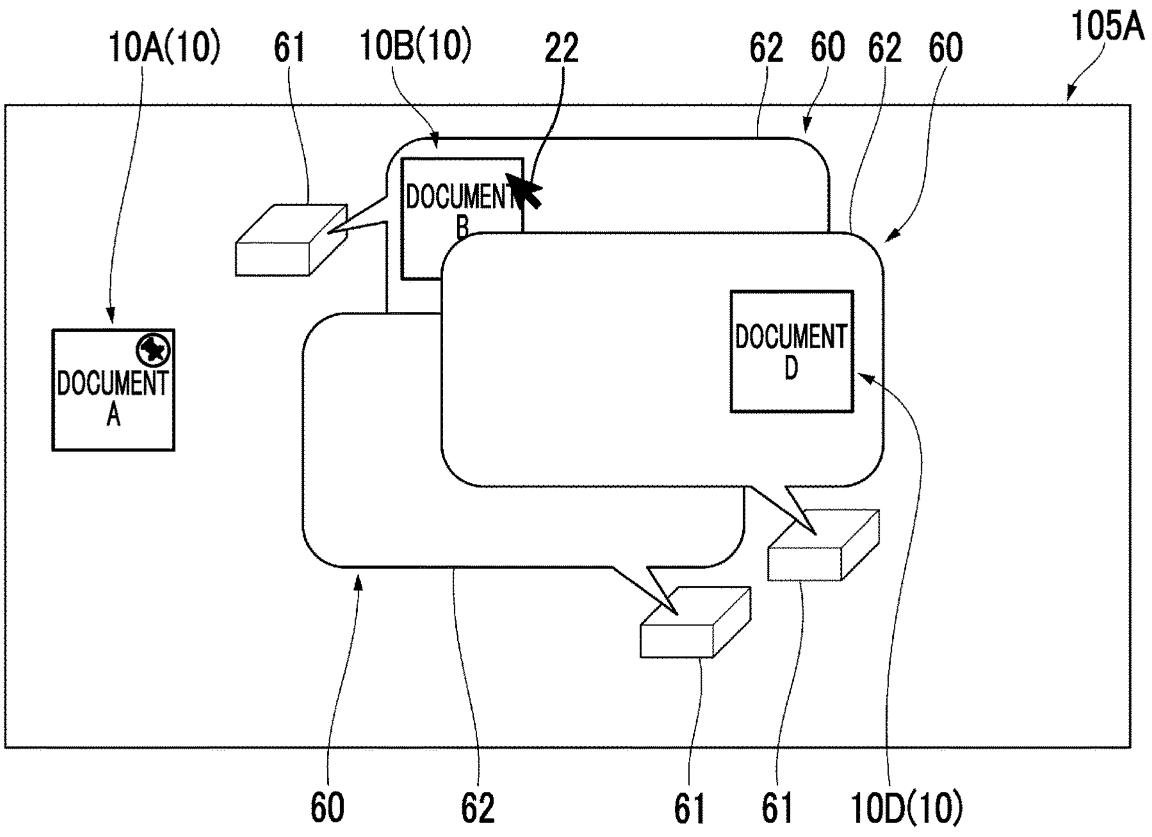
FIGS. 23A and 23B are diagrams illustrating display examples in the display unit of the display device.
Figure 23B:
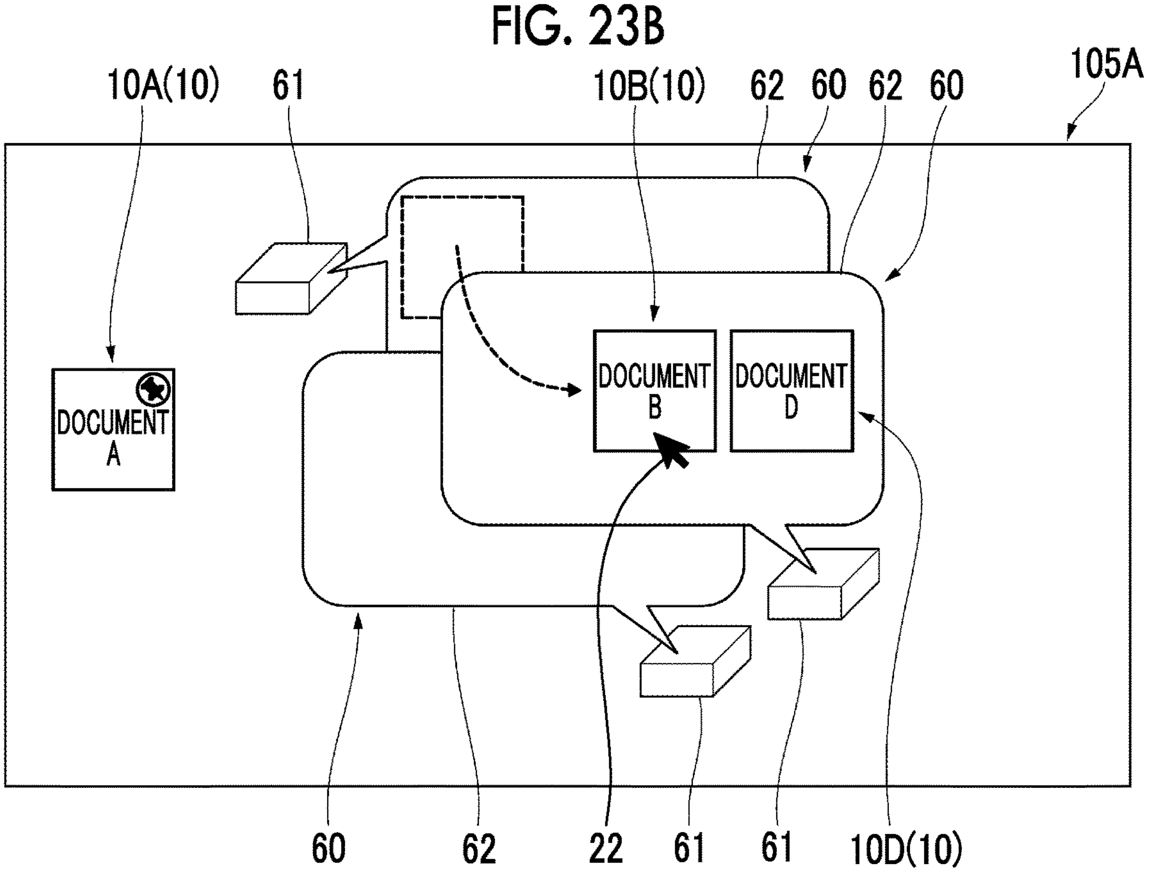

Then, in this example, as illustrated in FIGS. 23A and 23B, the user moves the document image 10B from the location where one document display image 62 is displayed to the location where the other document display image 62 is displayed.

In the processing example illustrated in FIGS. 17A to 23B, the user performs an operation of temporarily hiding the large image 300 and redisplaying the large image 300.

Specifically, in this processing example, the user performs an operation of selecting the selection item 801 "comparison mode ON" (see FIG. 17A). In the present exemplary embodiment, by performing the operation of selecting the selection item 801 "comparison mode ON", the large image 300 is temporarily hidden and the large image 300 is redisplayed.

In other words, in the present exemplary embodiment, the user performs an operation of temporarily changing the display of the large image 300 and further changing the display of the large image 300.

The operation of selecting the selection item 801 "comparison mode ON" can be said to be an operation of temporarily changing the display of the large image 300 and further changing the display of the large image 300 (hereinafter, referred to as "redisplay operation").

In the present exemplary embodiment, in a case where this redisplay operation is performed, as described above, the large image 300 is hidden and then the large image 300 is redisplayed.

In the present exemplary embodiment, in a case where the user performs an operation (selection operation) for the back image 30 (see FIG. 17B) located behind the large image 300, and the user performs a redisplay operation, as described above, the display of the large image 300 is changed, and the large image 300 is temporarily hidden.

Further, in the present exemplary embodiment, as described above, after the user performs the operation of selecting the back image 30, the large image 300 that has been hidden is redisplayed.

Further, the user's operation of selecting the selection item 801 "comparison mode ON" can be said to be an input operation in which the user inputs information indicating that the back image 30 and the large image 300 are compared.

In the present exemplary embodiment, in a case where the user performs an operation on the back image 30 and the user performs this input operation, the CPU 111 changes the display of the large image 300 to hide the large image 300.

In the present exemplary embodiment, in a case where the selection item 801 "comparison mode ON" is selected and the comparison mode is enabled, this comparison mode is basically continued thereafter.

In a case where this comparison mode is disabled, for example, the selection portion 95 (see FIG. 17A) of the document image 10A is selected again.

Further, for example, a dedicated selection item for disabling the comparison mode may be displayed near the document image 10A, and the comparison mode may be disabled in a case where there is a user's operation on the selection item.

Further, in FIG. 17A, the case has been described as an example in which the large image 300 and the selection item 801 "comparison mode ON" are displayed in a case where a document image 10A located in a location deviated from the document display image 62 is selected.

Figure 24:
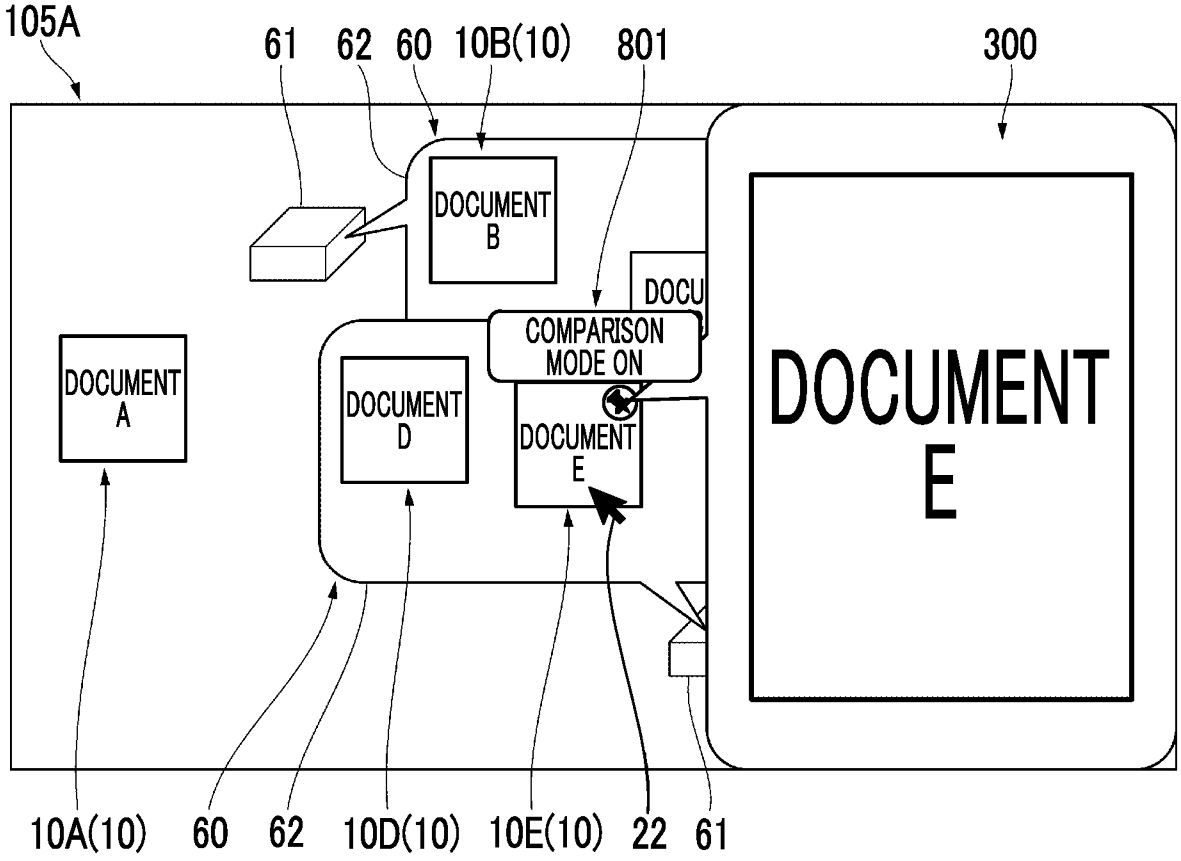
FIG. 24 is a diagram illustrating a display example in the display unit of the display device.

In addition to this, for example, as illustrated in FIG. 24, in a case where the document image 10 (document image 10E) displayed on the document display image 62 is selected, the large image 300 may also be displayed, and the selection item 801 "comparison mode ON" may be displayed.

Then, even in this case, in a case where the selection item 801 is selected and the document image 10 other than the document image 10E is selected, the large image 300 and the corresponding image 70 corresponding to the other document image 10 are displayed side by side as in the case illustrated in FIG. 18B.

It should be understood that each process described above is not limited to the above-described exemplary embodiments and its modification example, and may be changed within a range without departing from the spirit. In other words, it is understood that various changes in form and details may be made without departing from the spirit and scope of the invention as defined in the appended claims.

For example, a part of each process described above may be omitted, or another process may be added to each process described above.

Further, although a plurality of processes have been described above, the process included in one process and the process included in the other process are exchanged, or the process included in the other process may be added to the one process.

What is claimed is:

1. A non-transitory computer readable medium storing an information processing program causing a computer to execute:

a function of, in response to a user selecting an image displayed on a display unit, displaying a large image larger than the selected image, which is the image selected by the user, on the display unit; and a function of, in response to the user selecting another image displayed on the display unit and different from the selected image, and moving the another image located in a location deviated from the display location of the large image to a display location of the large image to overlap with the large image, automatically and without requiring an additional user action other than the moving, determining that the another image overlaps the large image, and temporarily hiding at least a part of the large image displayed on the display unit such that a storage image, which is an image used for storing information in a specific storage area, being present behind the large image displayed on the display unit is visible to the user.

2. The non-transitory computer readable medium storing an information processing program according to claim 1, causing the computer to execute:

a function of, after the user moves the another image, returning a state of the large image that is in a state after the display is changed, to a state before the display is changed.

3. The non-transitory computer readable medium storing an information processing program according to claim 2, causing the computer to execute:

a function of displaying a hidden part of the large image of which at least a part has been hidden, after the user moves the another image.

4. The non-transitory computer readable medium storing an information processing program according to claim 1, causing the computer to execute:

a function of, in a state where the user selects the another image by using an apparatus used for selecting the another image, in response to the user operating a part-to-be-operated provided on the apparatus or another apparatus, changing the display of the large image.

5. A non-transitory computer readable medium storing an information processing program causing a computer to execute:

a function of, in response to a user selecting an image displayed on a display unit, displaying a large image larger than the selected image, which is the image selected by the user, on the display unit;

a function of, in response to the user selecting a selection item of a comparison mode, temporarily hiding at least a part of the large image displayed on the display unit while maintaining the large image in a displayed state, such that a back image, which was previously hidden behind the large image, is visible to the user through the hidden part of the large image; and a function of, in response to the user selecting the back image through the hidden part of the large image, changing display of the large image by performing at least one among redisplay, changing a display position, changing to enlarge a size, or changing to increase a display density on the large image, and displaying a corresponding image, that is larger than the back image and corresponds to the back image, and the changed large image side by side on the display unit.

6. The non-transitory computer readable medium storing an information processing program according to claim 5, causing the computer to execute:

a function of, in response to the user performing an operation on the back image, and the user performing an operation of further changing the display of the large image, after the display of the large image is changed once, changing the display of the large image.

7. The non-transitory computer readable medium storing an information processing program according to claim 6, causing the computer to execute:

a function of hiding at least a part of the large image displayed on the display unit, in response to the user performing a predetermined operation on an another image;

a function of displaying at least a part of the large image that has been hidden, after the user performs the predetermined operation on the another image; and a function of performing a change of hiding at least a part of the large image, in response to the user performing an operation on the back image, and the user performing an operation of displaying the hidden part again after the at least a part of the large image has been hidden.

8. The non-transitory computer readable medium storing an information processing program according to claim 5, causing the computer to execute:

a function of performing a process of displaying the at least a part of the large image that has been hidden, after the user performs an operation on the back image.

9. The non-transitory computer readable medium storing an information processing program according to claim 5, causing the computer to execute:

a function of, in response to the user performing an operation on the back image and the user performing an operation of inputting information indicating that the back image and the large image are compared, changing the display of the large image.

* * * * *